(12) United States Patent
Hirai

(10) Patent No.: US 12,386,566 B2
(45) Date of Patent: Aug. 12, 2025

(54) CONTROL OVER INCREASING PRINTING MATERIAL BASED ON DETERMINATION OF SUBSCRIPTION SERVICE OPERATION MODE AND NETWORK SETUP PROCESS BASED ON INTERNET CONNECTION

(71) Applicant: CANON KABUSHIKI KAISHA, Tokyo (JP)

(72) Inventor: Yoshiyuki Hirai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/239,218

(22) Filed: Aug. 29, 2023

(65) Prior Publication Data

US 2024/0078062 A1 Mar. 7, 2024

(30) Foreign Application Priority Data

Sep. 5, 2022 (JP) .................. 2022-140896

(51) Int. Cl.
*G06F 3/12* (2006.01)
(52) U.S. Cl.
CPC ............ *G06F 3/121* (2013.01); *G06F 3/1239* (2013.01); *G06F 3/1286* (2013.01); *G06F 3/1287* (2013.01)
(58) Field of Classification Search
CPC .......... H04N 1/00127–00347; H04N 1/00832; H04N 1/00925; H04N 1/00954; H04N 1/034; H04N 1/2346; G06K 15/4045; G06K 15/407; G06K 15/4075; G06K 15/102; B41J 2/17506; B41J 2/17509; B41J 2/175; B41J 2/17503; B41J 2/1752; B41J 2/17523; G06F 3/121; G06F 3/1239; G06F 3/1286; G06F 3/1287
See application file for complete search history.

(56) References Cited

U.S. PATENT DOCUMENTS

| 5,631,681 A | * | 5/1997 | Klaus ................... B41J 2/17509 347/85 |
| 6,502,919 B1 | * | 1/2003 | Tanabe ................ B41J 2/16508 347/23 |
| 6,820,972 B2 | * | 11/2004 | Kinalski ............ G03G 15/0894 347/85 |
| 9,098,216 B2 | * | 8/2015 | Oleinik ................. G06F 3/1285 |
| 9,128,607 B2 | * | 9/2015 | Hosono ................ H04N 1/0048 |

(Continued)

FOREIGN PATENT DOCUMENTS

JP 2021-022876 A 2/2021

*Primary Examiner* — Scott A Rogers
(74) *Attorney, Agent, or Firm* — VENABLE LLP

(57) ABSTRACT

A printing apparatus determines whether it has connected to the Internet in a case where an operation to power on is accepted before initial setup of the printing apparatus is completed, and executes predetermined control for preventing a process for holding printing material in the printing apparatus from being performed by a user. Contract information is obtained through the Internet in a case where the printing apparatus has connected to the Internet, and it is confirmed whether the user can use the printing apparatus in a contract status indicated by the contract information. The predetermined control is cancelled in a case where the printing apparatus connects to the Internet and it is confirmed the user can use the printing apparatus in the contract status indicated by the contract information.

10 Claims, 17 Drawing Sheets

(56) References Cited

U.S. PATENT DOCUMENTS

| | | | |
|---|---|---|---|
| 9,967,414 B2* | 5/2018 | Kawakami | H04N 1/2346 |
| 10,270,657 B2* | 4/2019 | Utoh | H04L 67/1097 |
| 10,348,923 B2* | 7/2019 | Tolia | H04N 1/00042 |
| 10,645,239 B2* | 5/2020 | Kanematsu | H04N 1/00477 |
| 11,159,682 B2* | 10/2021 | Okamoto | H04N 1/00244 |
| 11,221,809 B2* | 1/2022 | Smith | G06F 3/1285 |
| 11,400,726 B2* | 8/2022 | Oguchi | B41J 2/17509 |
| 11,463,599 B2 | 10/2022 | Watanabe et al. | |
| 11,669,036 B2* | 6/2023 | Sahara | G06F 3/1285 |
| | | | 399/27 |
| 11,840,094 B2* | 12/2023 | Hamada | B41J 29/393 |
| 2005/0060546 A1* | 3/2005 | Parry | B41J 2/17546 |
| | | | 713/171 |
| 2015/0370518 A1* | 12/2015 | Ramchandran | G06F 3/1219 |
| | | | 358/1.15 |
| 2019/0258432 A1* | 8/2019 | Iwasaki | G06F 3/1204 |
| 2019/0299625 A1* | 10/2019 | Mizutani | B41J 2/17553 |
| 2022/0060597 A1* | 2/2022 | Adachi | H04N 1/00244 |
| 2023/0182481 A1* | 6/2023 | Shioiri | G06F 3/1239 |
| | | | 347/43 |
| 2023/0241896 A1* | 8/2023 | Suda | B41J 29/38 |
| | | | 347/7 |

* cited by examiner

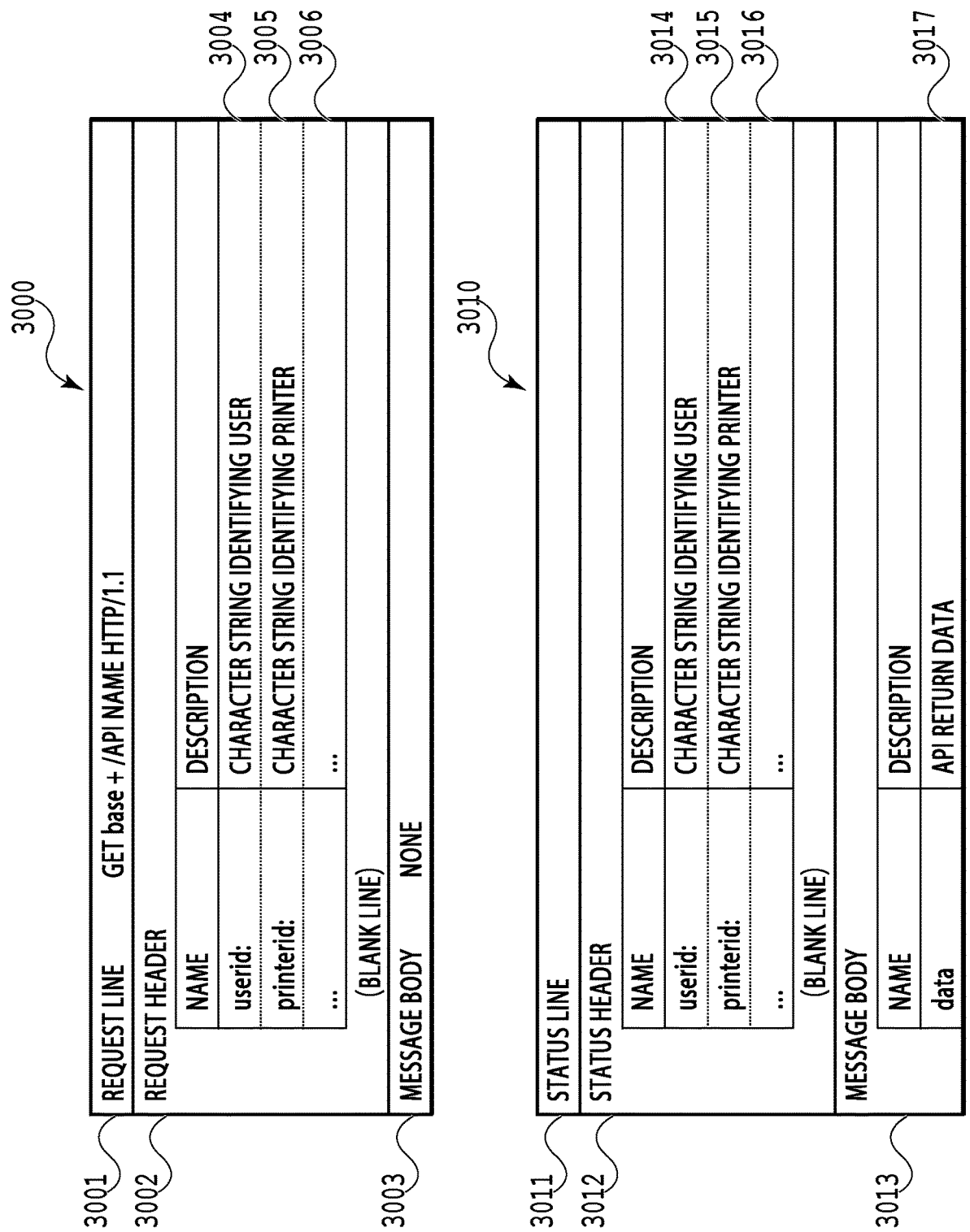

| | |
|---|---|
| 3101 | USER ID |
| 3102 | DETAILED USER INFORMATION (ADDRESS, NAME, AGE, ...) |
| 3103 | CURRENT-PERIOD STORAGE VOLUME UPPER LIMIT |
| 3104 | CURRENT-PERIOD USED STORAGE VOLUME |
| 3105 | CURRENTLY HELD POINT |

| | |
|---|---|
| 3111 | PRINTER ID |
| 3112 | PRINTER STATUS: 0 = NORMAL, NOT 0 = ERROR |
| 3113 | REMAINING INK AMOUNT: 0-100% |
| 3114 | CURRENT-PERIOD PRINTED SHEET COUNT |
| 3115 | CURRENT-PERIOD PRINTED SHEET COUNT UPPER LIMIT |

| | |
|---|---|
| 3121 | JOB ID |
| 3122 | USER ID |
| 3123 | PRINTER ID |
| 3124 | JOB STATUS INFORMATION (WAITING TO PRINT, PRINTING, PRINTED, PRINTED BY ANOTHER PRINTER, ...) |
| 3125 | PRINT PARAMETER SETTINGS (SHEET SIZE, SHEET TYPE, USED INKS, ...) |
| 3126 | PRINT JOB DATA |
| 3127 | REPRINTING FLAG |

| | |
|---|---|
| 3131 | CONTRACT ID |
| 3132 | USER ID |
| 3133 | PRINTER ID |
| 3134 | CONTRACT TYPE: PAY-AS-YOU-GO, FLAT RATE, DELIVERY, ... |
| 3135 | DETAILED CONTRACT INFORMATION (PERIOD, FEE, ...) |
| 3136 | PRINTED SHEET COUNT UPPER LIMIT |
| 3137 | STORAGE VOLUME UPPER LIMIT |

| | |
|---|---|
| 3141 | ORDER ID |
| 3142 | CONTRACT ID |
| 3143 | DETAILED ORDER INFORMATION (INK TYPE, QUANTITY, ...) |
| 3144 | ORDER DATE |
| 3145 | SCHEDULED ARRIVAL DATE |

CONTROL OVER INCREASING PRINTING MATERIAL BASED ON DETERMINATION OF SUBSCRIPTION SERVICE OPERATION MODE AND NETWORK SETUP PROCESS BASED ON INTERNET CONNECTION

BACKGROUND

Field of the Invention

The present disclosure relates to a printing apparatus, a method of controlling a printing apparatus, and a storage medium.

Description of the Related Art

Printing apparatuses go through initial setup operations to be ready to use after being shipped to users. The users perform the initial setup by following a designated procedure while seeing an instruction manual, an operation screen on the printing apparatus, a mobile terminal, or the like.

The main setup operations that the users perform in the initial setup include ink setup and network setup. The ink setup is an operation of setting inks, which are consumables to be used by the printing apparatus for printing, on the printing apparatus and filling the inks into the printing apparatus. The network setup is an operation of configuring settings for connecting the printing apparatus to a desired access point so that the printing apparatus and external apparatuses can communicate with each other through a network. After the network setup is completed, a contracted service(s) is(are) checked through the network thus set up.

The above two types of setup are not directly associated with each other in terms of order. Hence, either setup may be performed before the other. Japanese Patent Laid-Open No. 2021-22876 discloses simultaneous execution of ink setup and network setup.

SUMMARY

Printing apparatuses that can obtain contract information regarding contracts related to the use of the printing apparatuses and is connectable to networks have become popular. This has led to a demand to control such printing apparatuses more appropriately.

A printing apparatus according to an aspect of the present disclosure is a printing apparatus capable of executing printing using a printing material, including: an obtaining unit capable of obtaining contract information through a network, the contract information indicating a contract related to use of the printing apparatus; a control unit that executes predetermined control for preventing a process of increasing the printing material included in the printing apparatus from being performed in a state where the printing apparatus is connected to no network; and a cancellation unit that cancels the predetermined control in a case where the printing apparatus connects to a network.

Further features of the present invention will become apparent from the following description of exemplary embodiments with reference to the attached drawings.

BRIEF DESCRIPTION OF THE DRAWINGS

FIGS. 7A and 7B are diagrams illustrating web application programming interface (API) data structures;

FIGS. 8A to 8E are diagrams illustrating pieces of record data in the cloud server;

DESCRIPTION OF THE EMBODIMENTS

A preferred embodiment of the present disclosure will be exemplarily described below with reference to the drawings. It is to be understood that the scope of the present disclosure also encompasses embodiments obtained by changing or improving the embodiment described below as appropriate based on the ordinary knowledge of those skilled in the art without departing from the gist of the present disclosure.

Embodiment 1

Figure 1:
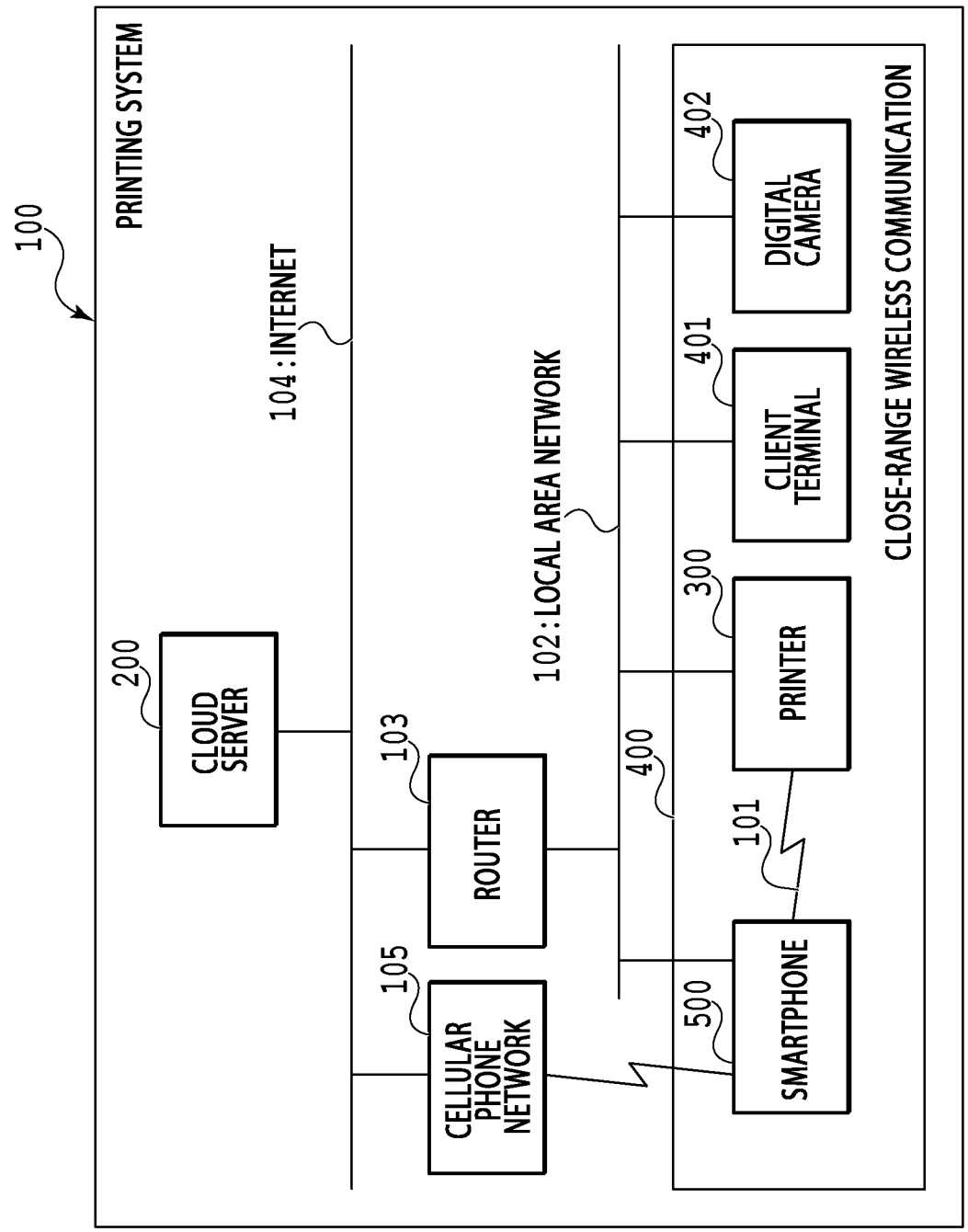
FIG. 1 is a diagram illustrating a configuration of a printing system.

FIG. 1 is a diagram illustrating a configuration of a printing system 100. The printing system 100 includes a cloud server 200 and devices 400 connected by a local area network (LAN) 102 and an Internet 104. The devices 400 includes various apparatuses connectable to networks. Examples of the devices 400 include a smartphone 500, a printer 300, a client terminal 401, such as a personal computer or a work station, a digital camera 402, and so on. However, the devices 400 are not limited to these types of apparatuses and may include home appliances such as a refrigerator, a television set, and an air conditioning, for example. These devices 400 can be connected to one another by the local area network 102 and connected to the Internet 104 via a router 103 installed in the local area network 102. The router 103 is illustrated as an apparatus that connects the local area network 102 and the Internet 104, but can be given a wireless LAN access point function that establishes the local area network 102. In this case, each of the devices 400 can be configured not only to connect to the router 103 through a wired LAN but also to connect to the access point through a wireless LAN to join the local area network 102. For example, the printer 300 or the client terminal 401 can be configured to connect to the router 103 through a wired LAN, and the smartphone 500 or the digital camera 402 can be configured to connect to the router 103 through a wireless LAN. Each of the devices 400 is capable of mutually communicating with the cloud server 200 through the Internet 104, to which the device 400 is connected via the router 103. The devices 400 are capable of mutually communicating with one another through the local area network 102. The smartphone 500 and the printer 300 are capable of communicating with each other by close-range wireless communication 101. Wireless communication complying with a Bluetooth (registered trademark) standard or a near-field communication (NFC) standard may be utilized as the close-range wireless communication 101. The smartphone 500 is also connected to a cellular phone network 105 and is capable of communicating with the cloud server 200 through this cellular phone network 105. This configuration represents an example of the present embodiment. A different configuration may be employed. For example, although an example in which the router 103 has an access point function has been presented, the access point may be configured of an apparatus other than the router 103.

Figure 2A:
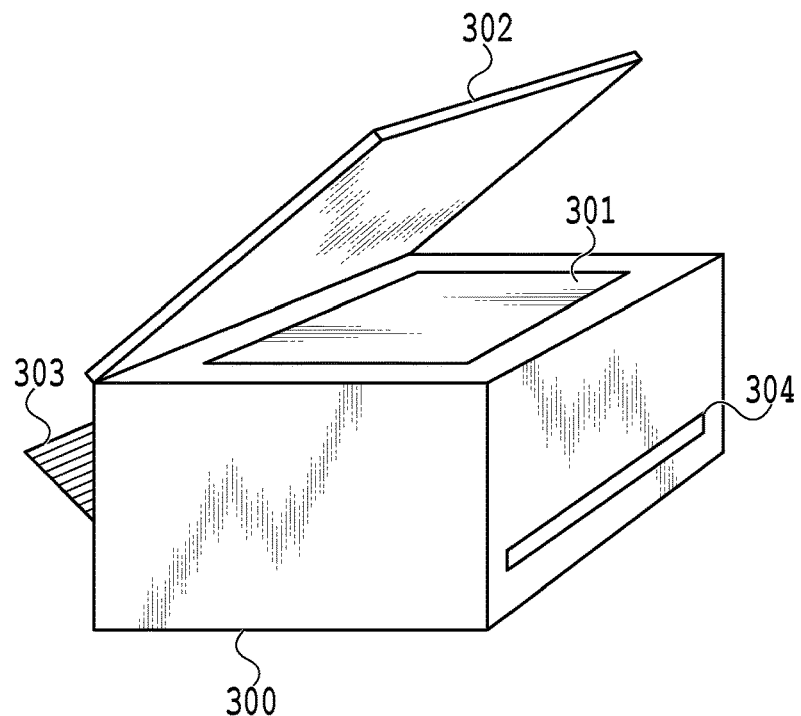
FIGS. 2A and 2B are exterior views of a printer.
Figure 2B:
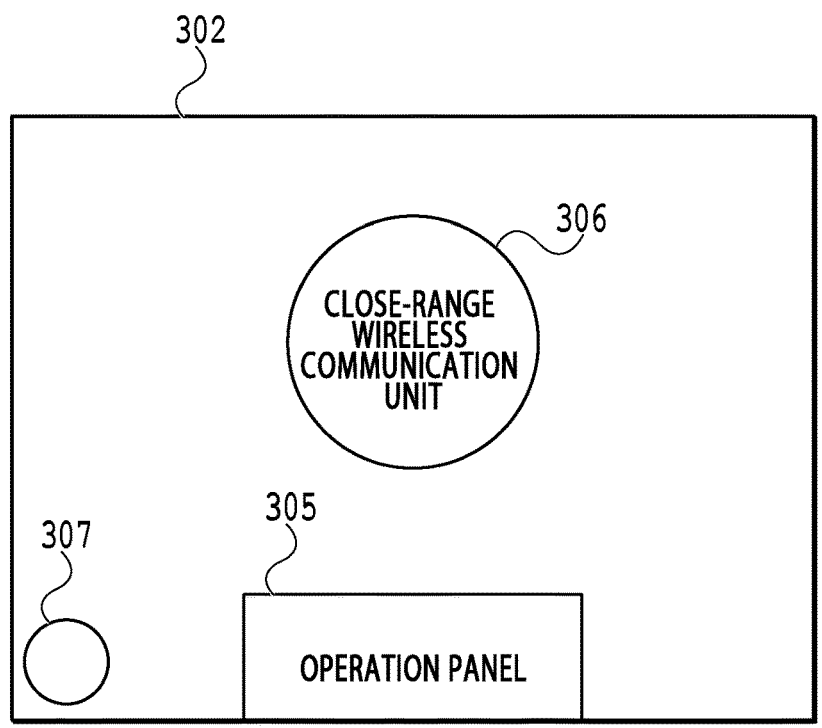

FIGS. 2A and 2B are exterior views of the printer 300. In the present embodiment, a multi-function printer (MFP) which is a printer equipped also with a scanner function or another function is employed as an example. FIG. 2A illustrates an exterior view of the whole printer 300. A document positioning plate 301 is a glassy clear plate and is used to read a document placed thereon with a scanner. A document positioning plate pressing plate 302 is a cover to be pressed against the document positioning plate to keep a document thereon from floating in a case of reading it with the scanner and also to block entry of external light into a scanner unit. A print sheet insertion port 303 is an insertion port where sheets of various sizes can be set. Sheets set at this print sheet insertion port 303 are conveyed one by one to a print unit, subjected to desired printing, and discharged from a print sheet discharge port 304.

FIG. 2B illustrates an exterior view of the upper face of the printer 300. An operation panel 305 and a close-range wireless communication unit 306 are arranged in the top of the document positioning plate pressing plate 302. The operation panel 305 is a touch panel-type liquid crystal display which can present various displays and on which the user can input operations addressed to the printer 300.

The close-range wireless communication unit 306 is a unit for performing close-range wireless communication and is capable of communicating with close-range wireless communication units of communication targets present within a predetermined distance. A wireless LAN antenna 307 is embedded as an antenna for connecting to the local area network 102 and performing communication using a wireless LAN.

Figure 3:
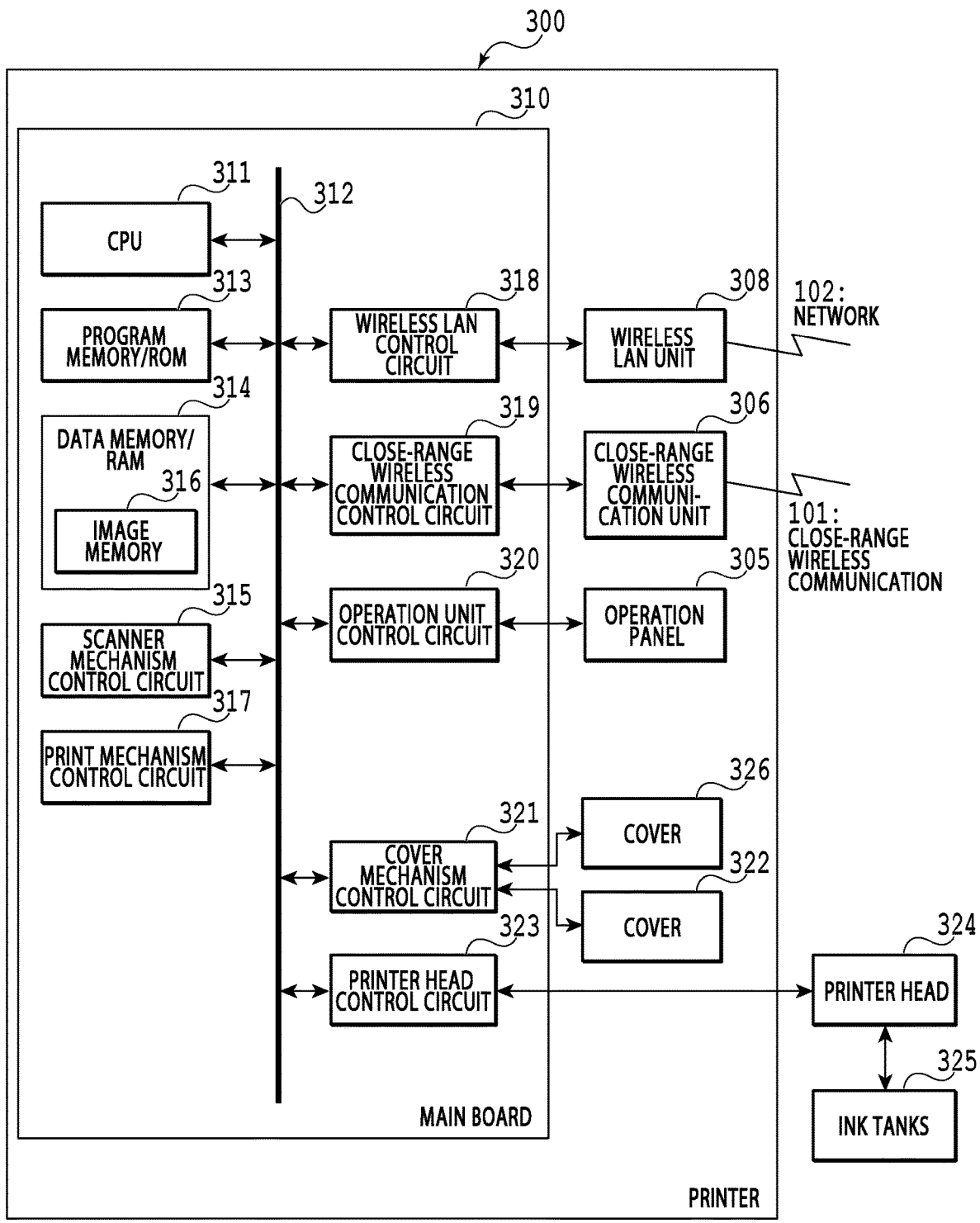
FIG. 3 is a diagram illustrating a hardware configuration of the printer.

FIG. 3 is a block diagram illustrating a configuration of the printer 300. The printer 300 has a main board 310 that comprehensively controls the apparatus, a wireless LAN unit 308, and the close-range wireless communication unit 306. A CPU 311 arranged on the main board 310, which is in the form of a microprocessor, operates in accordance with a control program stored in a program memory 313 connected via an internal bus 312, which is in the form of a rear-only memory (ROM), and contents in a data memory 314, which is in the form of a random access memory (RAM). The CPU 311 reads a document by controlling a scanner mechanism control circuit 315, and stores the result in an image memory 316 in the data memory 314. The CPU 311 is also capable of printing an image in the image memory 316 in the data memory 314 on a print medium by controlling a print mechanism control circuit 317. The CPU 311 performs wireless LAN communication with other communication terminal apparatuses by controlling the wireless LAN unit 308 via a wireless LAN control circuit 318. The CPU 311 is also capable of, for example, detecting connections to other close-range wireless communication terminals and sending and receiving data to and from the other close-range wireless communication terminals by controlling the close-range wireless communication unit 306 via a close-range wireless communication control circuit 319. The CPU 311 is capable of, for example, controlling the display of a status of the printer 300 or a function selection menu on the operation panel 305, and accepting operations from the user by controlling an operation unit control circuit 320. The CPU 311 is also capable of managing covers 322 and 326 by, for example, detecting the covers' states and locking their opening and closing via controlling a cover mechanism control circuit 321. Incidentally, an ink tank-incorporated printer includes the covers 326. The ink tank-incorporated printer will be described later. The operation unit control circuit 320 performs control related to operations and the cover mechanism control circuit 321 manages the covers 322 and 326, but these may be the same control circuit. The CPU 311 is also capable of managing a printer head 324 and ink tanks 325 by, for example, detecting states of the printer head 324 and the ink tanks 325 and changing the position of the printer head 324 via controlling a printer head control circuit 323. Incidentally, the print mechanism control circuit 317 performs control related to printing and the printer head control circuit 323 manages the printer head 324 and the ink tanks 325, but these may be the same control circuit.

Figure 4:
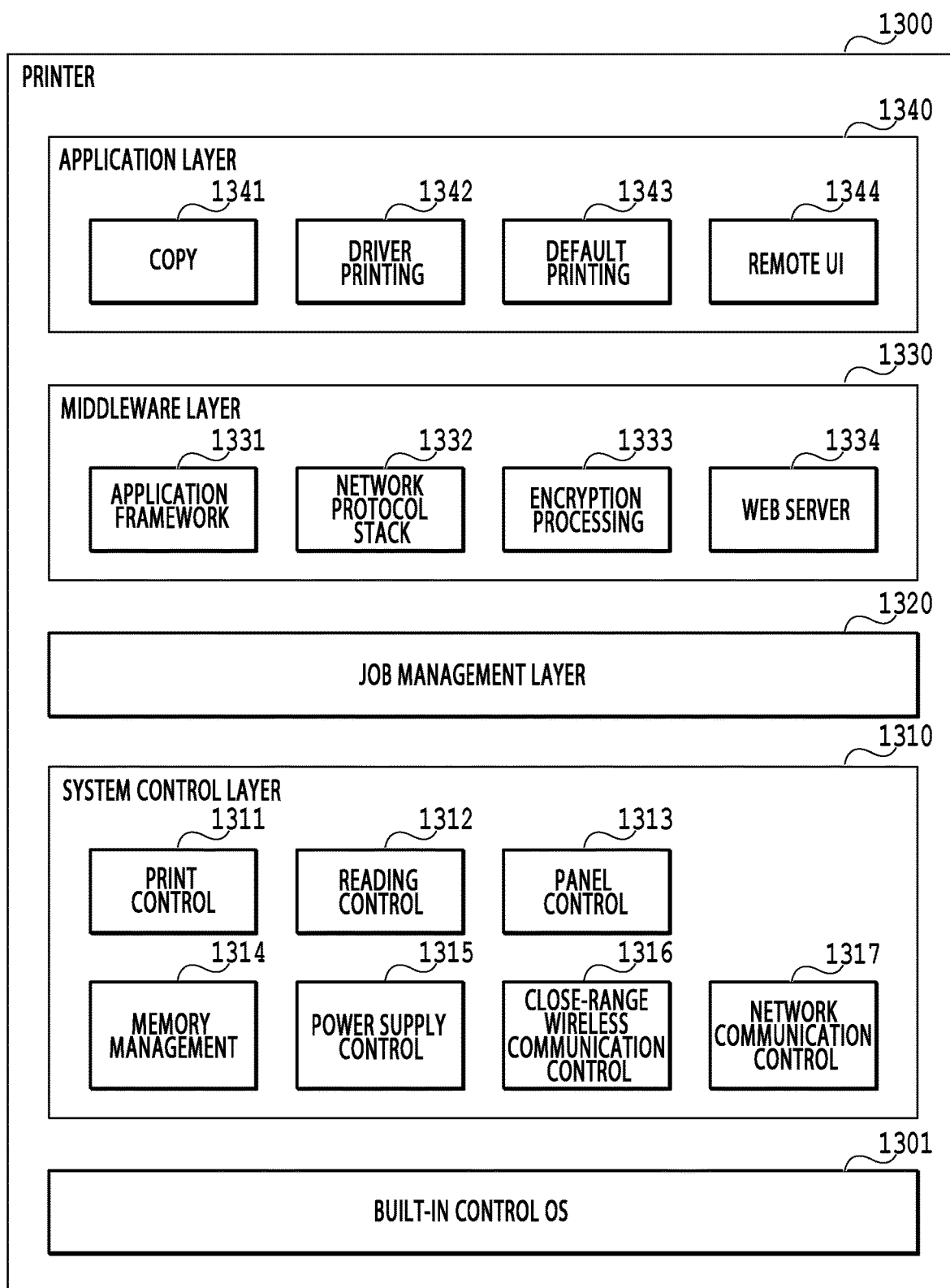
FIG. 4 is a software module diagram of the printer.

FIG. 4 is a diagram illustrating a module configuration of software that operates on the printer 300. Printer control software 1300, which operates on the printer 300, runs on a built-in control operating system (OS) 1301. Each module is broadly categorized in a system control layer 1310, a job management layer 1320, a middleware layer 1330, or an application layer 1340. The built-in control OS 1301 is an OS that controls the basic operation of the printer control software 1300. A real-time OS, which has excellent responsiveness, is usually used. The system control layer 1310 is a group of modules that mainly control hardware of the printer 300. A print control module 1311 is a control module for, for example, executing the print operation of the printer 300 by controlling the print mechanism control circuit 317, and managing the printer head 324 and the ink tanks 325 by controlling the printer head control circuit 323. A reading control module 1312 is a control module for executing an operation of reading a document placed on the document positioning plate 301 by controlling the scanner mechanism control circuit 315.

A panel control module 1313 is a control module for, for example, controlling the display on the operation panel 305 of the printer 300 and detecting various key operations and the state of the cover 322. A memory management module 1314 is a control module for performing management such as dynamic allocation of the data memory 314 and the image memory 316. A power supply control module 1315 is a control module for, for example, supplying hardware blocks with electric power necessary for operation and performing control in a power save mode by controlling the power supply of the printer 300. A close-range wireless communication control module 1316 is a control module for communicating with terminal apparatuses such as the smartphone 500 by controlling the close-range wireless communication unit 306. A network communication control module 1317 is a control module for controlling a physical communication layer for performing LAN communication with external apparatuses by controlling the wireless LAN unit 308. The job management layer 1320 is a group of modules that execute various operations using the system control layer 1310 while performing hardware resource allocation, exclusion control, scheduling, and the like in response to a job execution request from an upper layer. The middleware layer 1330 is situated between the application layer 1340 and the job management layer 1320, and is a group of modules commonly used by multiple function modules in the application layer 1340. An application framework 1331 is a framework module commonly used in a case where the application layer 1340 requests the job management layer 1320 to execute a job.

A network protocol stack 1332 is a module for performing communication in compliance with various network protocols, such as the Hypertext Transfer Protocol (HTTP) and the Transmission Control Protocol/Internet Protocol (TCP/IP). An encryption processing module 1333 is a module for performing encryption and decryption processing necessary in network communication and the like. A web server module 1334 is a module for causing the printer 300 to operate as a web server in order to distribute remote user interface (UI) contents. The application layer 1340 is a group of applications that implement various functions of the printer 300. A copying application 1341 is an application module for executing a copying operation to read and print a document. A driver printing application 1342 is an application module for receiving jobs from printer drivers in the smartphone 500 and the client terminal 401 and executing operations. Examples of the jobs from the drivers include a print job for executing a print operation, a scan job for reading a document and outputting image data, a maintenance job for exchanging information with an external apparatus to configure settings of the printer 300 and perform management, and the like. A default printing application 1343 is an application module that receives jobs from a default printing service included in a system in the smartphone 500 and executes operations. Examples of the jobs from the default printing service include a print job for executing a print operation, and a scan job for reading a document and outputting image data. Note that the default printing service is provided by the manufacturer of the smartphone or the vendor of the default OS. Hence, there is a limitation that makes it impossible to configure and manage settings specific to individual manufacturers' printer models. A remote UI module 1344 is a module that provides a remote UI function of the printer 300 to external apparatuses by using the web server module 1334. By using a remote UI, it is possible to configure and manage settings of the printer 300. In particular, in the printer 300 described in the present embodiment, information that can be displayed and set on the operation panel 305 is limited. The remote UI is therefore used to configure and manage more detailed settings. Also, in a case where the smartphone 500 or the client terminal 401 is not provided with a dedicated driver, only the default printing service will be used. For this reason, it will be essential to use the remote UI to configure and manage detailed settings.

The printer 300 in the present embodiment is such that its connection mode is set by network setup to be described later, and the printer 300 communicates with the smartphone 500 by a form of connection that is based on the set connection mode. The printer 300 in the present embodiment is set to an infrastructure connection mode as the connection mode in a case of performing communication through an infrastructure connection.

<<Infrastructure Connection Method>>

An infrastructure connection refers to a form of connection in which apparatuses are made to communicate with each other (e.g., the smartphone 500 and the printer 300) connect to an access point managing a network for these apparatuses (e.g., the router 103) and communicate with each other via the access point. The printer 300 is capable of operating in a mode for performing communication through an infrastructure connection (infrastructure connection mode) as one connection mode. In the present embodiment, an infrastructure connection is implemented in accordance with a communication standard under the IEEE 802.11 series.

In an infrastructure connection, each apparatus searches for an access point by means of an apparatus search command. After finding an access point, the rest of the wireless connection process (such as establishing a wireless connection) is performed between the apparatus and the access point, which is followed by an Internet protocol (IP) connection process (such as allocating an IP address). As for commands and parameters sent and received between the apparatus and the access point to establish a wireless connection therebetween, those predefined in a communication standard under the IEEE 802.11 series may be used, and description thereof is omitted below.

In the present embodiment, in a case where the printer 300 operates through an infrastructure connection, the router 103 operates as a master apparatus and the printer 300 operates as a slave apparatus. In sum, in the present embodiment, an infrastructure connection refers to a connection between the printer 300 operating as a slave apparatus and an apparatus operating as a master apparatus. In a case where the printer 300 has established an infrastructure connection and the smartphone 500 has also established an infrastructure connection to the router 103, the printer 300 and the smartphone 500 can communicate with each other via the router 103. The router 103 determines the channel to be used in the communication through the infrastructure connection. Thus, the printer 300 executes communication through the infrastructure connection by using the channel determined by the router 103. In the present embodiment, the printer 300 is capable of using channels in a 2.4 GHz frequency band and channels in a 5 GHz frequency band for communication through the infrastructure connection. The printer 300 is capable of also using channels in the dynamic frequency selection (DFS) range in the 5 GHz frequency band for communication through the infrastructure connection. In order to communicate with the printer 300 via the router 103, the smartphone 500 needs to recognize that the printer 300 belongs to a network which is formed by the router 103 and to which the smartphone 500 belongs.

In the present embodiment, the printer 300 is capable of simultaneously establishing a direct connection and an infrastructure connection. In other words, the printer 300 is capable of simultaneously establishing a wireless fidelity (Wi-Fi) connection in which the printer 300 operates as a slave apparatus and a Wi-Fi connection in which the printer 300 operates as a master apparatus. This operation in a state of simultaneously establishing the above two connections is called simultaneous operation. Incidentally, a direct connection refers specifically to a form of connection in which apparatuses are directly (i.e., Peer-to-Peer) and wirelessly connected to each other without an external apparatus such as the router 103 interposed therebetween.

<<Network Setup>>

In the present embodiment, the smartphone 500 executes network setup as setup to cause the printer 300 to operate in the infrastructure connection mode by using wireless communication with the printer 300. Network setup in the present embodiment is also called cableless setup (CLS) since it is executed via wireless communication. Network setup may be executed via wired communication.

The smartphone 500 performs network setup on the printer 300 in a case where a predetermined application stored in a ROM 104, an external storage apparatus 106, or the like is activated. The predetermined application refers to an application for, for example, setting an access point for the printer 300 to connect to and causing the printer 300 to print image data, document data, or the like in the smartphone 500, and will hereinafter be referred to as "printing application". The printing application may have other functions in addition to the function of setting an access point for the printer 300 to connect to and the printing function. For example, in a case where the printer 300 has a scan function, the printing application may have a function of causing the printer 300 to scan a set document, a function of configuring other settings of the printer 300, a function of checking the status of the printer 300, and the like. The user can, for example, print desired images and set communication apparatuses, as well as using functions of the communication apparatuses via a display screen displayed by the printing application.

For example, the smartphone 500 executes a process of causing the printer 300 to execute printing in response to detecting that a print button displayed by the printing application is pressed. This process includes a process of accepting selection of an image to be printed and a process of sending a print job for causing the printer 300 to execute the printing.

The smartphone 500 executes a process for causing the printer 300 to execute scanning in response to detecting that a scan button is pressed. This process includes a process of sending a scan job for causing the printer 300 to execute scanning and a process of receiving an image obtained by the scanning executed based on the scan job.

The smartphone 500 starts network setup in response to detecting that a printer setup button is pressed.

The printer 300 is capable of operating in a connection setup mode (connection setup state) which is a mode for executing network setup, and executes network setup in a state of operating in the connection setup mode. Details of the connection setup mode will be described later.

In a case of causing the printer 300 to operate in the infrastructure connection mode, the smartphone 500 wirelessly sends the printer 300 infrastructure setup information which is setup information for causing it to operate in the infrastructure connection mode. The infrastructure setup information contains information on the router 103. The information on the router 103 is, for example, information on its service set identifier (SSID), password, frequency band, and the like.

In the present embodiment, a direct connection for connection setup between the smartphone 500 and the printer 300 is used to send the infrastructure setup information in network setup. In the present embodiment, network setup is executed using Wi-Fi as the direct connection for connection setup. However, the direct connection for connection setup is not limited to Wi-Fi. For example, a wireless communication standard other than Wi-Fi, such as Bluetooth, may be used, or a wired communication standard, such as a wired LAN or the Universal Serial Bus (USB), may be used.

After establishing an infrastructure connection via Wi-Fi or a direction connection between the smartphone 500 and the printer 300 by the network setup, the smartphone 500 and the printer 300 can communicate with each other through the established connection. Specifically, for example, the smartphone 500 can send a print job for causing the printer 300 to execute printing and a scan job for causing the printer 300 to execute scanning to the printer 300 through the established connection.

<<Connecting Setup Mode>>

As described above, the printer 300 is capable of operating in the connecting setup mode. A trigger for the printer 300 to start operating in the connection setup mode may be, for example, pressing of a connection setup mode button by the user or booting of the printer 300 (shifting to a software-on state). The connection setup mode button may be a hardware button included in the printer 300 or a software button displayed by the printer 300 on the operation panel 305. After starting operating in the connection setup mode, the printer 300 activates Wi-Fi communication. Specifically, the printer 300 is caused to operate as an access point dedicated for the connection setup mode. In this way, the printer 300 can establish a direct connection to the smartphone 500 via Wi-Fi. Connection information (such as SSID) for connecting to the dedicated access point for the connection setup mode is held beforehand in a setup program for the printer 300 installed in the smartphone 500. Also, the smartphone 500 has acknowledged connection information for connecting to the software access point dedicated for the connection setup mode beforehand. Thus, unlike connection information of an access point to be activated in a direct connection mode, at least part of the connection information for connecting to the dedicated software access point for the connection setup mode (such as at least part of the SSID) cannot be changed as desired by the user. In the present embodiment, there is no password for connecting to the dedicated software access point for the connection setup mode. The smartphone 500 can connect to the printer 300 operating in the connection setup mode with no password as long as the smartphone 500 has acknowledged the SSID. The present embodiment is not limited to this configuration. For example, the configuration may be such that a password for connecting to the dedicated software access point for the connection setup mode is also held in the setup program for the printer 300 beforehand and the password is used to establish a connection to the printer 300 operating in the connection setup mode.

In the connection setup mode, the printer 300 may connect to the smartphone 500 via Wi-Fi Direct (WFD), instead of normal Wi-Fi. Specifically, the printer 300 may operate as the Group Owner and receive setup information from the smartphone 500 by communication via WFD. WFD is a standard specified by the Wi-Fi Alliance and included as a communication standard (Wi-Fi communication standards) in the IEEE 802.11 series. In the connection setup mode, the printer 300 may connect to the smartphone 500 via Bluetooth. Specifically, the printer 300 may operate as a slave apparatus in Bluetooth and receive setup information from the smartphone 500 by communication via Bluetooth (communication via a Bluetooth connection). The Bluetooth may be Bluetooth Classic or Bluetooth Low Energy (BLE). In a case of using BLE, a communication apparatus starts sending advertisement information complying with the BLE standard after starting operating in the connection setup mode, and shifts to a state where the communication apparatus can establish a BLE connection to the smartphone 500 having received the advertisement information. The connection setup mode may be a state where Wi-Fi and Bluetooth are both usable. Specifically, the printer 300 operating in the connection setup mode may receive setup information via a Wi-Fi connection in a case where it received a connection request from the smartphone 500 via Wi-Fi. The printer 300 may receive setup information via a Bluetooth connection in a case where it received a connection request from the smartphone 500 via Bluetooth.

The smartphone 500 and the printer 300 share the processing in the above-described manner as an example. The sharing of the processing is not particularly limited to this manner and may be done in another manner.

Figure 5:
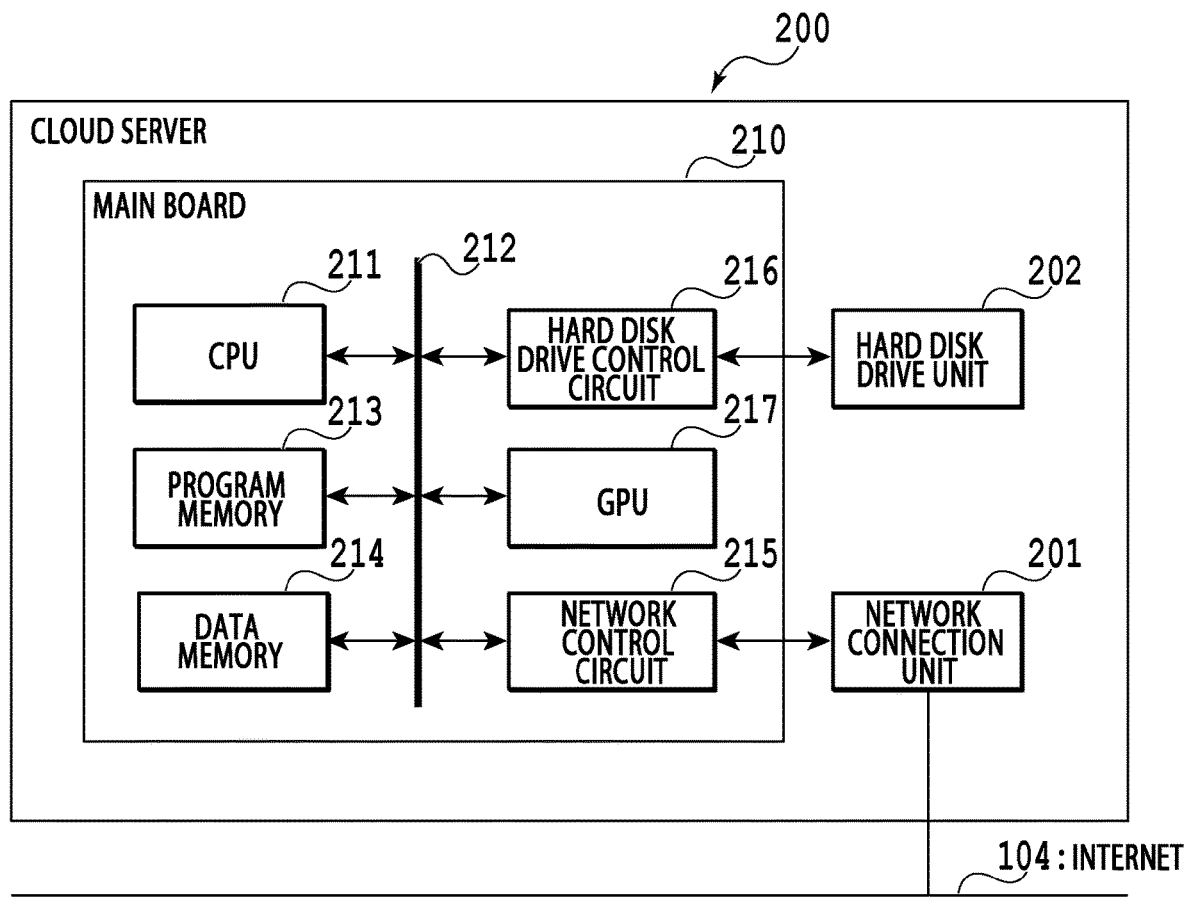
FIG. 5 is a diagram illustrating a hardware configuration of a cloud server.

FIG. 5 is a block diagram illustrating a configuration of the cloud server 200. The cloud server 200 has a main board 210 that comprehensively controls the apparatus, a network connection unit 201, and a hard disk drive unit 202. A CPU 211 arranged on the main board 210, which is in the form of a microprocessor, operates in accordance with a control program stored in a program memory 213 connected via an internal bus 212 and contents in a data memory 214. The CPU 211 connects to a network such as the Internet 104 and communicates with other apparatuses by controlling the network connection unit 201 via a network control circuit 215. The CPU 211 is capable of reading and writing data out of and to the hard disk drive unit 202 connected via a hard disk drive control circuit 216. The hard disk drive unit 202 stores an OS or a control software for the cloud server 200 to be loaded to and used in the program memory 213 as well as various data. A GPU 217 is connected to the main board 210 and is capable of executing various kinds of arithmetic processing on behalf of the CPU 211.

Figure 6:
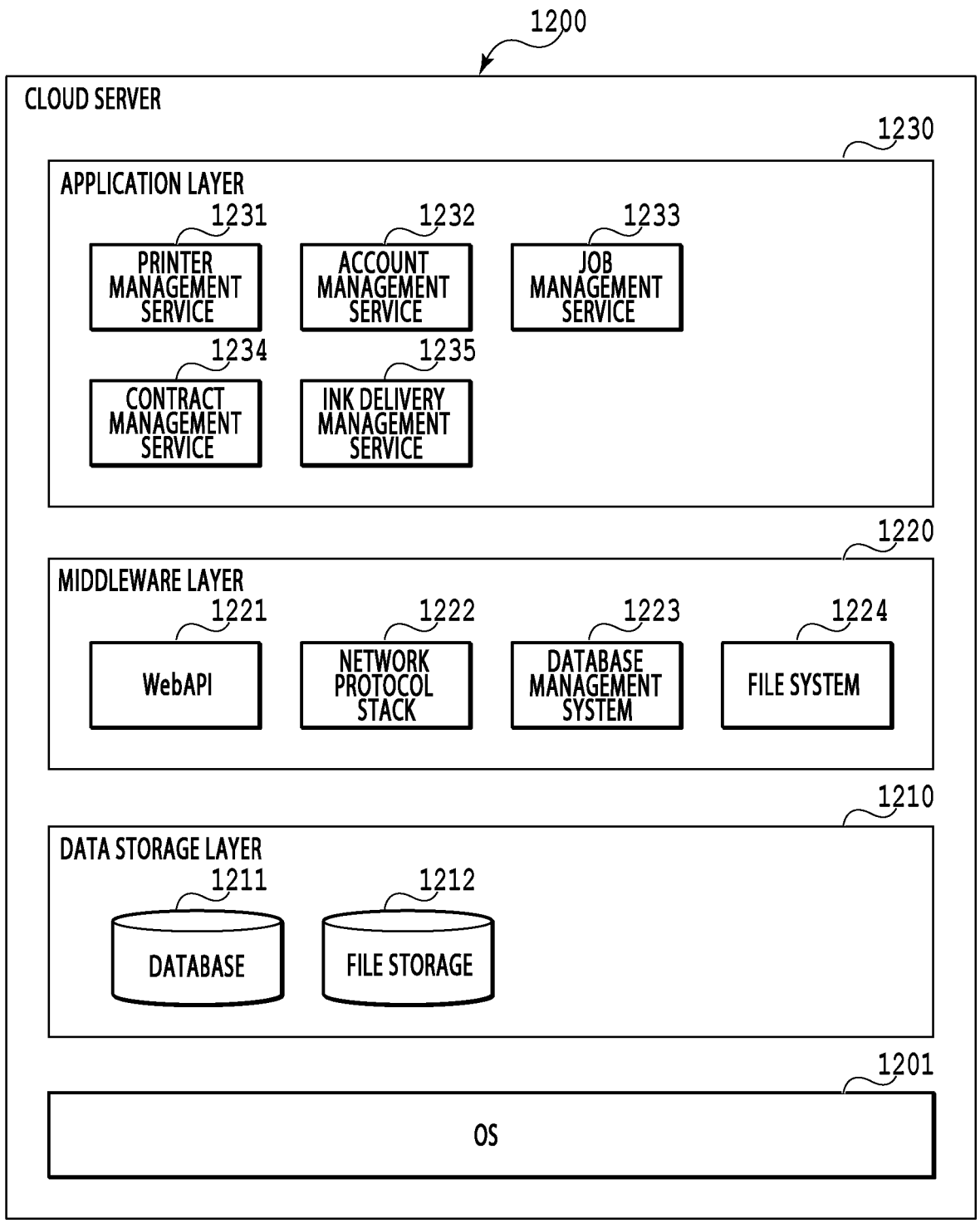
FIG. 6 is a software module diagram of the cloud server.

FIG. 6 is a diagram illustrating a module configuration of software that operates on the cloud server 200. Software 1200, which operates on the cloud server 200, runs on an OS 1201. Each module is broadly categorized in a data storage layer 1210, a middleware layer 1220, and an application layer 1230. Each module is implemented by loading the module stored in the hard disk drive unit 202 to the program memory 213 and the data memory 214 and executing it as appropriate. The data storage layer 1210 has a database and a file storage in which to store and manage information to be used in various services. A database 1211 stores the data of a relational database managed by a database management system 1223. A file storage 1212 stores files and the like managed by a file system 1224. The files stored in the file storage 1212 include image data of print jobs to be printed by the printer 300, image data obtained by scanning by the printer 300, and the like. The middleware layer 1220 is situated under the application layer 1230 and includes a group of modules to be commonly used by multiple application modules in the application layer 1230.

A web API service 1221 is a module for performing a web API process for a service(s) to be provided by the cloud server 200. A web API is defined as a data structure to be handled in the HTTP protocol. The web API service 1221 requests modules for services 1231 to 1235 in the application layer 1230 to perform processes based on the contents of an HTTP request received using a network protocol stack 1222. The web API service 1221 also receives the results of the requested processes by the modules, and performs a process of returning an HTTP response to the requester using the network protocol stack 1222. The network protocol stack 1222 is a module for performing communication in compliance with various network protocols, such as HTTP and TCP/IP. The database management system 1223 is a module that provides a management function for accessing the information in the database 1211 from the services 1231 to 1235 in the application layer 1230. The file system 1224 is a module that provides a management function such as reading and writing files out of and to the file storage 1212 from the services 1231 to 1235 in the application layer 1230.

The application layer 1230 is a group of services that provide various functions of the cloud server 200. A printer management service 1231 provides functions to manage information on the registered printer 300. The provided functions include managing status notifications received from the printer 300, requesting ink delivery according to a status of the printer 300 based on a service use contract, and managing the number of sheets printed by the printer 300 and restricting printing above an upper limit based on a service use contract.

An account management service 1232 provides functions to manage information on registered service users. The provided functions include managing information on the service users, managing the volume of the data stored in the file storage 1212 based on a service use contract, restricting data storage of a volume exceeding an upper limit, and the like.

A job management service 1233 provides functions to manage information on jobs for service users to execute printing, scanning, and the like with the registered printer 300. The provided functions include receiving job execution requests from service users, spooling job data in the file storage, notifying the printer 300 of the job data, and returning job information in response to an inquiry from the printer 300. Other functions include receiving and managing job status notifications from the printer 300, deleting the data of completed jobs from the file storage, and the like.

A contract management service 1234 provides functions to manage service use contract information related to use of the printer 300, which is a registered printer for service users. The provided functions include managing information of service use contracts and the like.

An ink delivery management service 1235 provides functions to manage information for delivering inks that are consumables to be used on the printer 300 from the service provider to service users based on a service use contract. The provided functions include performing a necessary procedure for delivery of an ink(s) to a service user in response to an ink delivery request from the printer management service 1231, managing information on the ink delivery, and the like.

FIG. 6 is depicted assuming a case where the cloud server 200 is constructed as a single physical server. Alternatively, the configuration may be such that the multiple modules described above are distributed to and constructed on two or more physical servers. For example, the services 1231 to 1235 in the application layer may each be caused to operate on a different physical server. Moreover, an application server that provides these services and the database 1211 or the file storage 1212 may each be caused to operate on a different physical server.

FIGS. 7A and 7B are diagrams illustrating web API data structures for the cloud server 200. FIG. 7A illustrates a data structure of an API request 3000. The API request 3000 is sent to the cloud server 200 from the printer 300 as an HTTP request. The whole API request 3000 is described as text data, and its structure is defined by lines divided by line feed codes. The first line in the API request 3000 is a request line 3001. The request line 3001 begins with the request HTTP method, which is followed by a universal resource identifier (URI) identifying the requested resource and an indication of the protocol version, and ends with a line feed code. The URI is a combination of "base", which is a URI indicating the location of the cloud server 200, and a character string following the URI indicating the name of the API request. The section from the line next to the request line 3001 down to the line where the first blank line appears is a request header 3002. The request header 3002 is used to pass the request or additional information on an HTTP client which is the request source to an HTTP server which is the request destination. In FIG. 7A, as an example, a character string 3004 identifying a user is described after a name character string "userid:", and a character string 3005 identifying a printer is described after a name character string "printerid:". Other parameters can be described in a line 3006 and subsequent lines. The line following the blank line after the request header 3002 is referred to as a message body 3003. In the message body 3003 is described the very data to be passed to the HTTP server from the HTTP client based on the type of the request HTTP method. The message body 3003 may not be present depending on the type of the API.

FIG. 7B illustrates a data structure of an API response. This data structure is used to return an HTTP response to the printer 300 from the cloud server 200 as a response to the API request 3000. A whole API response 3010 is described as text data, and its structure is defined by lines divided by line feed codes. The first line in the API response 3010 is a status line 3011. The status line 3011 begins with the version of the protocol, which is followed by a numerical status code and a character string, and ends with a line feed code. The section from the line next to the status line 3011 down to the line where the first blank line appears is a status header 3012. The status header 3012 is used to pass a status or additional information on data to be passed in a message body 3013 included in the HTTP response or the like to the HTTP client, which is the request source. In FIG. 7B, as an example, a character string 3014 identifying the user is described after a name character string "userid:", and a character string 3015 identifying the printer is described after a name character string "printerid:". Other parameters can be described in a line 3016 and subsequent lines. The lines following the blank line after the status header 3012 are referred to as the message body 3013. In the message body 3013 is described the very data to be passed to the HTTP client from the HTTP server. FIG. 7B exemplarily illustrates a case where API return data 3017 is stored, but the message body 3013 may not be present depending on the type of the API.

FIGS. 8A to 8E are diagrams illustrating data structures of records stored in the database in the cloud server 200. The data structure of each table is defined as a set of attribute values grouped together. The attributes include a primary key uniquely identifying the records stored in the table, and foreign keys for referring to records in other tables. In FIGS. 8A to 8E, the data structures are illustrated to be divided into upper and lower frames. The attribute including the primary key is described in the upper box, and the attributes including the foreign keys are described in the lower box. In the present embodiment, the five pieces of record data illustrated in FIGS. 8A to 8E (user information record 3100, printer information record 3110, job information record 3120, contract information record 3130, and delivery information record 3140) will be described as an example.

FIG. 8A is a diagram illustrating a data structure of the user information record 3100 stored in a user information table. A user ID 3101 is a primary key, with which a desired record can be uniquely identified out of multiple records stored in the user information table. Detailed user information 3102 stores attribute information such as a user's address, name, age, and the like. A current-period storage volume upper limit 3103 stores an upper limit for the storage volume in a current period for the user. A current-period used storage volume 3104 stores the storage volume used in the current period by the user. The current period refers to a management period determined in accordance with a contract, and is managed based on a predetermined period of time, such as one month or one year. Also, the current-period storage volume upper limit 3103 is set for each management period based on the value of a storage volume upper limit 3137 in the contract information record 3130 to be described later, and can be changed during the period depending on the usage of the service. In this way, the user may be allowed to use the cloud server 200 while temporarily exceeding the storage volume designated in the contract. In a case where the current-period used storage volume 3104 exceeds the current-period storage volume upper limit 3103, the user of interest will not be able to store further data on the cloud server 200. A currently held point 3105 stores information on points held by the user. Points are granted according to the number of sheets printed or the amount of an ink(s) consumed, and the user can receive various services using the granted points. For example, the user can use the points to pay the fee for a contract, or pay for an article sold by a service provider.

FIG. 8B is a diagram illustrating a data structure of the printer information record 3110 stored in a printer information table. A printer ID 3111 is a primary key, with which a desired record can be uniquely identified out of multiple records stored in the printer information table. A printer status 3112 indicates whether an error has occurred on the printer 300 and, in a case where an error has occurred, stores information such as the type of the error. A remaining ink amount 3113 stores information on the remaining amounts of the inks used in the printer 300. In a case where the remaining amount of an ink falls to or below a predetermined amount, a warning is output or this state is determined as an error and the operation is stopped, for example. A current-period printed sheet count 3114 stores the number of sheets printed in the current period by the printer 300, which is the printer of interest. A current-period printed sheet count upper limit 3115 stores an upper limit for the number of sheets printed in the current period by the printer 300, which is the printer of interest. Also, the current-period printed sheet count upper limit 3115 is set for each management period based on the value of a printed sheet count upper limit 3136 in the contract information record 3130 to be described later, and can be changed during the period depending on the usage of the service. In this way, the user may be allowed to use the printer 300 while temporarily exceeding the number of printed sheets designated in the contract. In a case where the current-period printed sheet count 3114 exceeds the current-period printed sheet count upper limit 3115, the printer 300 of interest will not be able to further execute printing.

FIG. 8C is a diagram illustrating a data structure of the job information record 3120 stored in a job information table. A job ID 3121 is a primary key, with which a desired record can be uniquely identified out of multiple records stored in the job information table. A user ID 3122 is a foreign key and is used to identify a user who requested a job and to refer to information on that user in the user information table. A printer ID 3123 is a foreign key and is used to identify the printer 300 to execute the job and to refer to information on that printer in the printer information table. A job status information 3124 stores information on the current status of the job. The status can take a value such as "waiting to print," "printing," "printed," or "printed by another printer". Printing parameter settings 3125 store information on parameters designating printing conditions to be used in the job. This can include information such as the sheet size, the sheet type, and the types of inks to be used. Print job data 3126 stores information identifying print image data to be printed in the job. This is formed of address information of the job stored in the file storage 1212, or the like. A reprinting flag 3127 indicates whether the job is reprinting.

This is enabled in a case where reprinting is necessary after performing printing with another printer, and is cleared after the reprinting is completed.

FIG. 8D is a diagram illustrating a data structure of the contract information record 3130 stored in a contract information table. A contract ID 3131 is a primary key, with which a desired record can be uniquely identified out of multiple records stored in the contract information table. A user ID 3132 is a foreign key and is used to identify a user who is a subject of a contract and to refer to information on that user in the user information table. A printer ID 3133 is a foreign key and is used to identify a printer which is a subject of the contract and to refer to information on that printer in the printer information table. A contract type 3134 stores the type of the contract. The type of the contract includes a pay-as-you-go contract, a flat rate contract, a delivery contract, or the like. The pay-as-you-go contract is a contract in which the user is charged by how much the user used the printer. Specifically, it is a contract in which the user is charged according to the number of sheets printed or the amount of a consumable(s) consumed. The flat rate contract is a so-called subscription contract in which the user is charged a fixed usage fee for each predetermined period regardless of how much the user used the printer. It is a contract in which, for example, an upper limit is set for the number of sheets to be printed per a predetermined period or a limit is set for the storage volume of print data to be held on the cloud server 200 per a predetermined period, and the user is allowed to use the printer 300 or the cloud server 200 as much as the user wants within the limit. The delivery contract is a contract in which a consumable such as an ink will be automatically ordered and delivered in a case where the consumable runs low, and the user pays the amount of money corresponding to the ordered consumable to purchase it. The contract types described above are mere examples, and other forms of use may be provided as contracts. Detailed contract information 3135 stores detailed information on the contract. This can include information such as the period of the contract, the conditions of use, and the fee. The printed sheet count upper limit 3136 stores the upper limit for the number of sheets to be printed in the contract set for the printer 300 involved in the contract. The storage volume upper limit 3137 stores the upper limit for the storage volume in the contract set for the user involved in the contract.

FIG. 8E is a diagram illustrating a data structure of the delivery information record 3140 stored in a delivery information table. An order ID 3141 is a primary key, with which a desired record can be uniquely identified out of multiple records stored in the delivery information table. A contract ID 3142 is a foreign key and is used to identify a contract on which a delivery is based, and to refer to information on that contract in the contract information table. Detailed order information 3143 stores detailed information on the delivery. This can include information such as the ink type and the quantity. An order date 3144 stores the date on which the delivery was arranged. A scheduled arrival date 3145 stores the date on which the article arranged to be delivered is scheduled to be delivered to the user.

Figure 9:
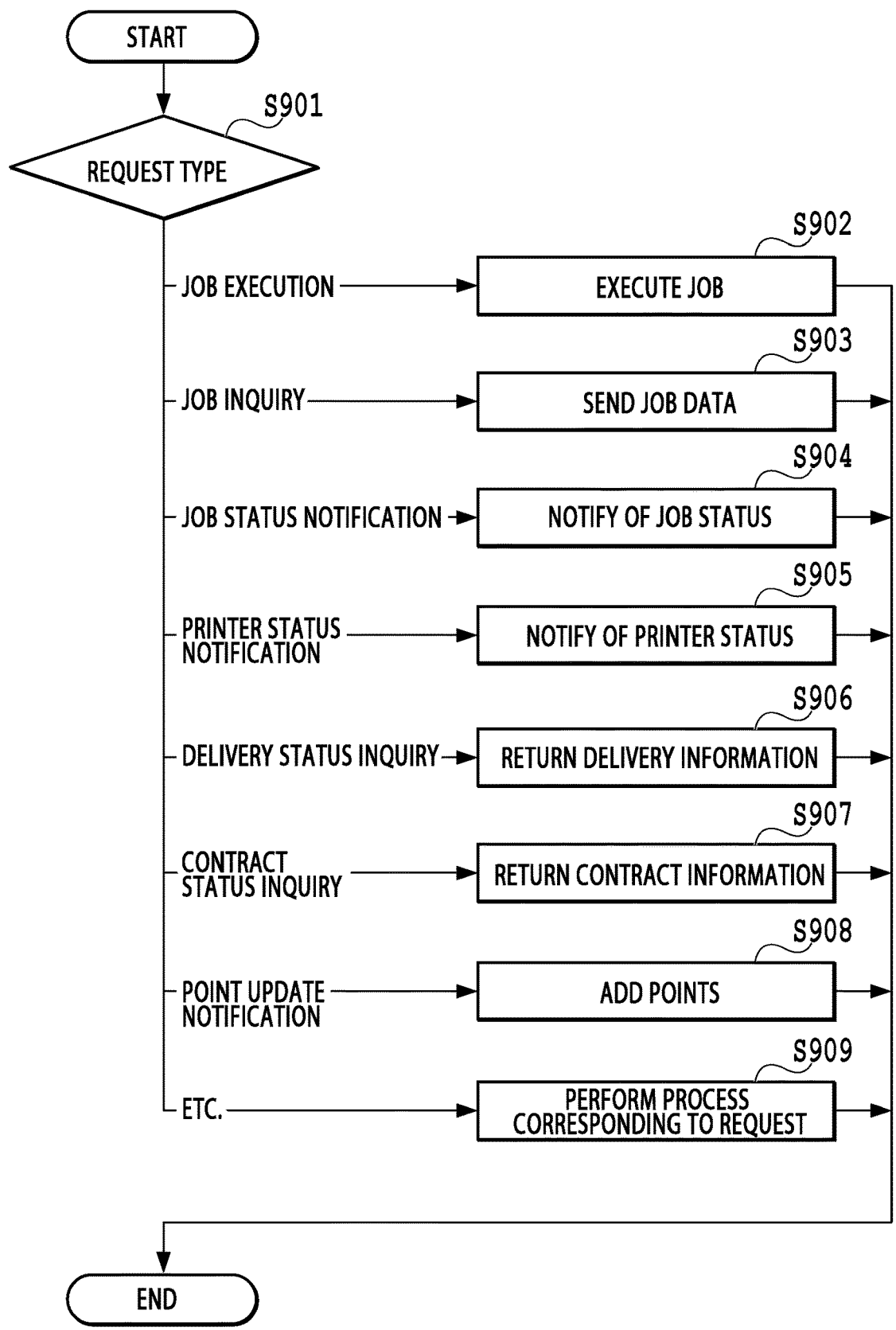
FIG. 9 is a flowchart of processing by the cloud server.

FIG. 9 is a flowchart illustrating a flow of processing performed in a case where the cloud server 200 receives a web API request. The CPU 211 of the cloud server 200 executes this processing in response to the cloud server 200 receiving a web API request from outside. The CPU 211 of the cloud server 200 performs the series of processes illustrated in this flowchart by loading program code stored in the program memory 213 to the data memory 214 and executing it. Note that "S" in the description of each process below means a step in the flowchart, and this applies also to the subsequent embodiments.

First, in S901, the CPU 211 of the cloud server 200 checks the type of the received web API request. In each of the subsequent steps, a process corresponding to the result of the check of the web API request type is performed.

If the request is job execution from a user terminal, the CPU 211 proceeds to S902 and performs a job execution process corresponding to the contents of the job.

If the request is a job inquiry from the printer 300, the CPU 211 proceeds to S903 and sends job data in a case where there is a job for the printer 300. The CPU 211 may send the job data by returning spooled job data itself as a web API response or returning a URI representing the spooled job data as a response.

If the request is job status notification from the printer 300, the CPU 211 proceeds to S904 and performs a job status notification process.

If the request is printer status notification from the printer 300, the CPU 211 proceeds to S905 and performs a printer status notification process.

If the request is a delivery status inquiry, the CPU 211 proceeds to S906, and obtains the corresponding delivery information record 3140 from the database 1211 and returns it as a web API response.

If the request is a contract status inquiry, the CPU 211 proceeds to S907, and obtains the corresponding contract information record 3130 from the database 1211 and returns it as a web API response.

If the request is point update notification, the CPU 211 proceeds to S908 and updates the currently held point 3105 in the user information record 3100 stored in the database 1211.

If the request is other than the above, the CPU 211 proceeds to S909 and performs a process corresponding to the request. After finishing any of the processes of S902 to S909, the CPU 211 terminates the flowchart.

Figure 10A:
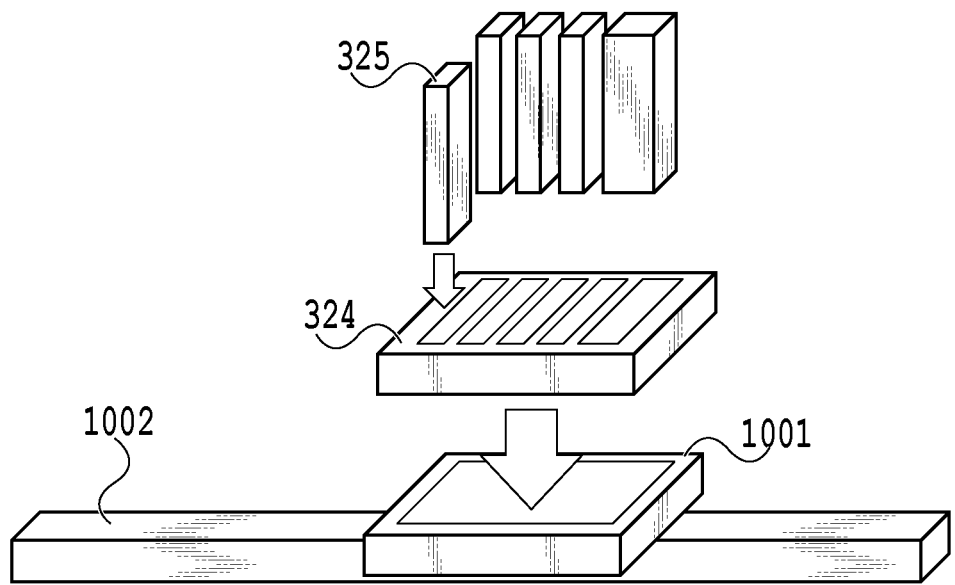
FIGS. 10A and 10B are views schematically illustrating ink setup of printers.
Figure 10B:
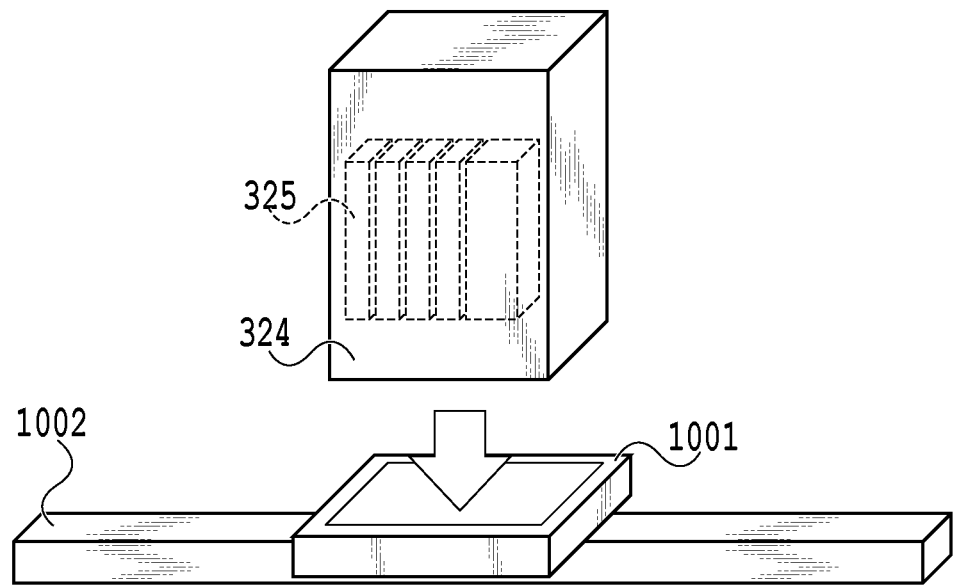

FIGS. 10A and 10B are schematic views illustrating configurations of the ink tanks 325 and the printer head 324 of the printer 300. In the present embodiment, the printer 300 is an ink-jet printer, and its print mechanism includes the printer head 324, which ejects inks onto a print medium, and the ink tanks 325, which hold the inks to be supplied to the printer head 324. The configuration of the print unit includes one in which the printer head 324 and the ink tanks 325 are formed separately and one in which the printer head 324 and the ink tanks 325 are formed integrally.

Incidentally, in a case where a problem occurs during the check of the service(s) contracted for the printer 300, the user will not be able to start using the printing apparatus. Due to this, the user may cancel the contracted service(s) and return the printing apparatus to the service provider. In this case, if ink setup has already been done, the printing apparatus may be returned with inks filled in the printing apparatus. This leads to a possibility of, for example, experiencing ink leakage during movement resulting from the return, having to perform maintenance work to reuse the printing apparatus, or wasting the inks filled in the setup, which requires a cost. Thus, in the present embodiment, control is performed so as to avoid the unnecessary cost.

FIG. 10A is a diagram illustrating a method of setting inks in an ink tank-separated printer head. The ink tank-separated printer head is such that demountable ink tanks 325 are mounted to a printer head 324, and the printer head 324 is mounted to a head mount 1001 connected to the printer 300. The head mount 1001 moves via a carriage 1002 provided in the printer 300 in parallel to the carriage 1002 while the printer head 324 ejects the inks in the ink tanks 325 to perform printing. The carriage 1002 and the head mount 1001 may be configured to be integral with each other. Incidentally, in the ink setting method with the separated type, the extent of work the user needs to perform is not particularly defined. For example, the configuration may be such that the printer head 324 and the head mount 1001 are already assembled at the time of shipping the printer 300 as a product, and the user only attaches or replaces the ink tanks 325.

FIG. 10B is a diagram illustrating a method of setting inks in an ink tank-integrated printer head. The ink tank-integrated printer head is such that ink tanks 325 and a printer head 324 are formed integrally with each other, and the user therefore mounts them to the head mount 1001 together. The head mount 1001 moves via the carriage 1002 provided in the printer 300 in parallel to the carriage 1002 while the printer head 324 ejects the inks in the ink tanks 325 to perform printing. The carriage 1002 and the head mount 1001 may be configured to be integral with each other. In the case of the integrated type, the ink tanks 325 and the printer head 324 are replaced together if the inks run out.

Figure 11A:
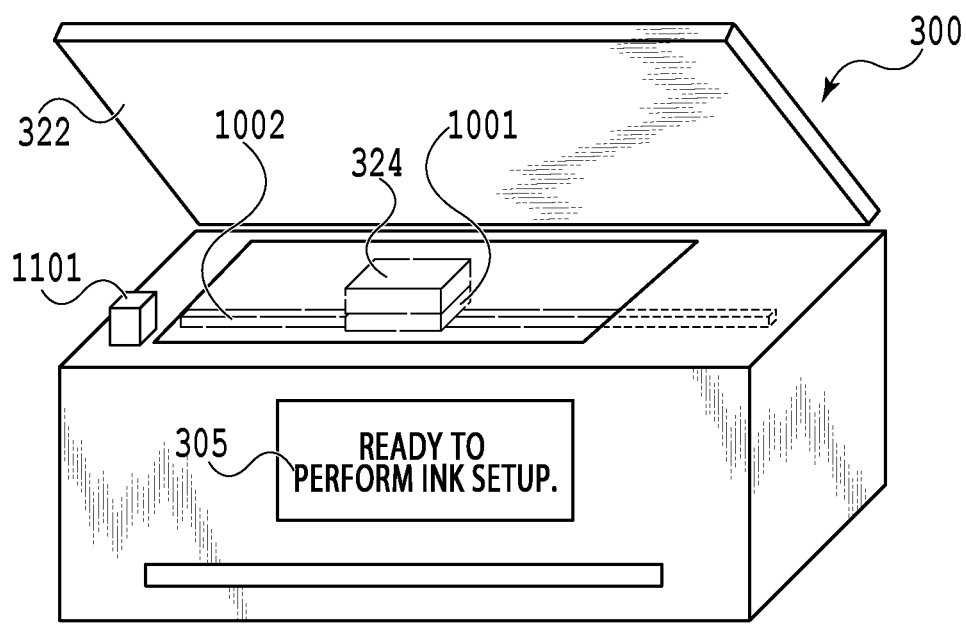
FIGS. 11A and 11B are exterior views of a printer in ink setup.
Figure 11B:
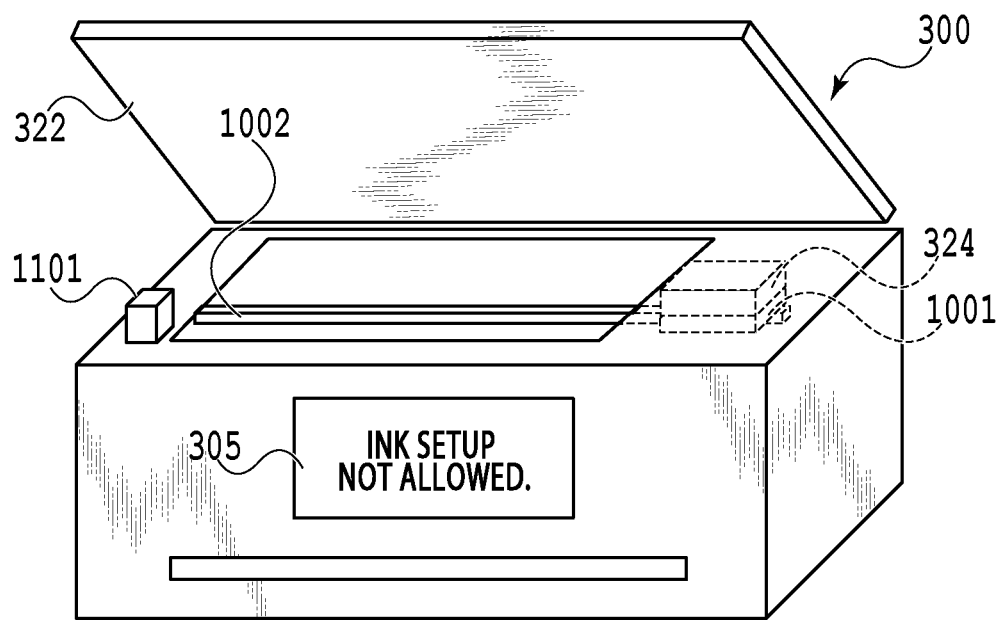

FIGS. 11A and 11B are exterior views illustrating a procedure to mount the ink tanks 325 and the printer head 324 described with reference to FIG. 10A or 10B to the head mount 1001. The mounting procedure in FIGS. 11A and 11B is applicable to both the ink tank-integrated printer head and the ink tank-separated printer head. The printer 300 includes the cover 322, which covers an opening portion of the printer 300. The cover 322 is capable of pivoting or moving between an open position in which the opening portion of the printer 300 is open and a closed position in which the cover 322 closes the opening portion of the printer 300. In a state where the cover 322 is located at the closed position, the printer head 324 is located at a standby position.

FIG. 11A is a view illustrating a state where the printer head 324 is at an ink setup-possible position as a result of the printer head 324 moving from the standby position in response to opening and moving the cover 322 to the open position. The ink setup-possible position is a position to which the printer head 324 can move in a case where ink setup is permitted in the later-described process performed in initial setup of the printer 300. FIG. 11B is a view indicating that the printer head 324 is at an ink setup-impossible position as a result of an ink setup prohibition process. The ink setup-impossible position is a position where the printer head 324 waits in a case where control is performed to prohibit ink setup in the later-described process performed in the initial setup of the printer 300. The ink setup-impossible position is the same as the standby position mentioned above. Hence, in the case where ink setup is prohibited, the printer head 324 does not move from the standby position even if the cover 322 is opened and moved to the open position. With the cover 322 located at the open position, the user can see the inside of the printer 300 from the opening portion of the printer 300 and attach the ink tanks 325 or the printer head 324 or both to the printer 300 via the head mount 1001. The printer 300 has a cover sensor 1101 for detecting whether the cover 322 is located at the closed position. In a case where the cover sensor 1101 detects that the cover has moved from the closed position, the printer 300 moves the head mount 1001 via the carriage 1002 from the standby position to a position within the opening portion as illustrated in FIG. 11A (cartridge attachment position). At this time, a display indicating that ink setup can be performed may be presented on the operation panel 305. Incidentally, ink setup consumes the inks to some extent. Even in a case where the inks are not ejected onto a print medium in the ink setup, the inks in the ink tanks 325 are consumed since the inks are supplied into the printer head 324 from the ink tanks 325.

The user attaches the printer head 324 to the head mount 1001. Then, in a case where the cover sensor 1101 detects that the cover 322 has returned to the closed position, the printer 300 moves the head mount 1001 via the carriage 1002 to the ink setup-impossible position illustrated in FIG. 11B from the ink setup-possible position. The ink setup-impossible position is covered by an outer covering of the printer 300. Thus, it is physically impossible for the user to attach the ink tanks 325 or the printer head 324 to the head mount 1001. At this time, a display indicating that ink setup cannot be performed may be presented on the operation panel 305. In the present embodiment, the replacement position for the printer head 324 is set within an opening portion in an upper part of the printer 300, but another configuration may be employed. For example, a configuration may be employed in which an opening portion is present in a side face or the front face instead of the upper face and the user performs ink setup through the side face or the front face.

Figure 12A:
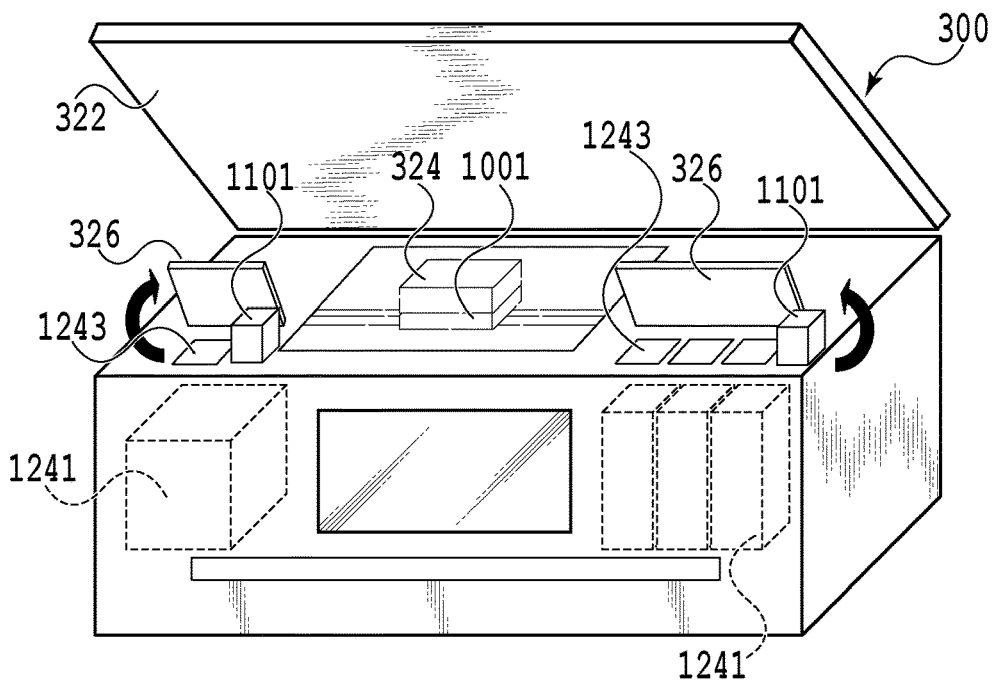
FIGS. 12A and 12B are views illustrating a configuration of a printer for ink setup.
Figure 12B:
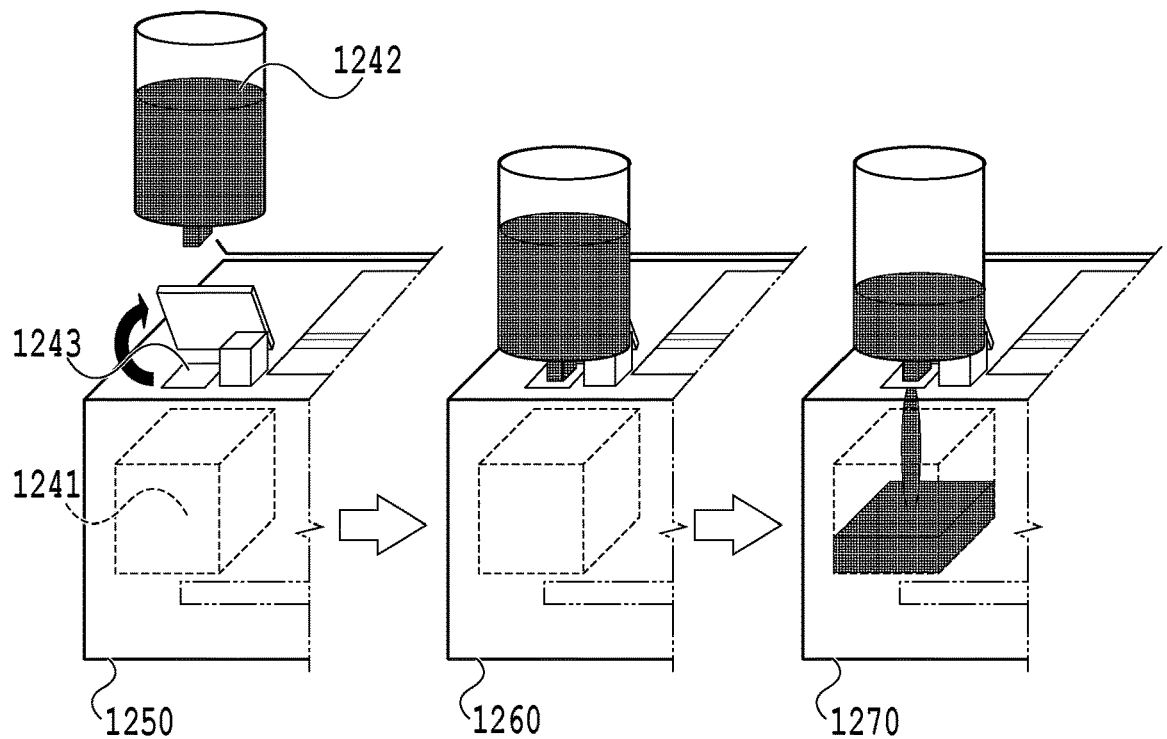

FIGS. 12A and 12B are configuration diagrams illustrating an example in which the ink tanks are incorporated inside the printer 300. The printer 300 incorporating the ink tanks is referred to as "ink tank-incorporated printer". Also, the ink tanks illustrated in FIGS. 12A and 12B are referred to as "incorporated ink tanks 1241".

FIG. 12A illustrates a configuration of an ink tank-incorporated printer. The incorporated ink tanks 1241 supply inks to the printer head 324 through tubes not illustrated. The ink tank-separated type and the ink tank-integrated type are similarly configured to eject the inks from the printer head 324 to perform printing. In FIGS. 12A and 12B, the incorporated ink tanks 1241 are separated based on the ink colors and incorporated in the left and right of the printer 300 from the viewpoint of accommodation, but may be incorporated together at one position.

FIG. 12B illustrates an ink setup method for the ink tank-incorporated type. First, in a step 1250, an ink bottle 1242 is prepared. The ink bottle 1242 is sufficiently filled with an ink. Then, in a step 1260, the ink bottle 1242 is connected to an ink inlet port 1243. As a result, in a step 1270, the ink starts being introduced. Specifically, the ink in the ink bottle 1242 is introduced into the incorporated ink tank 1241 through the ink inlet port 1243. Incidentally, some of the ink is consumed in this step.

Figure 13A:
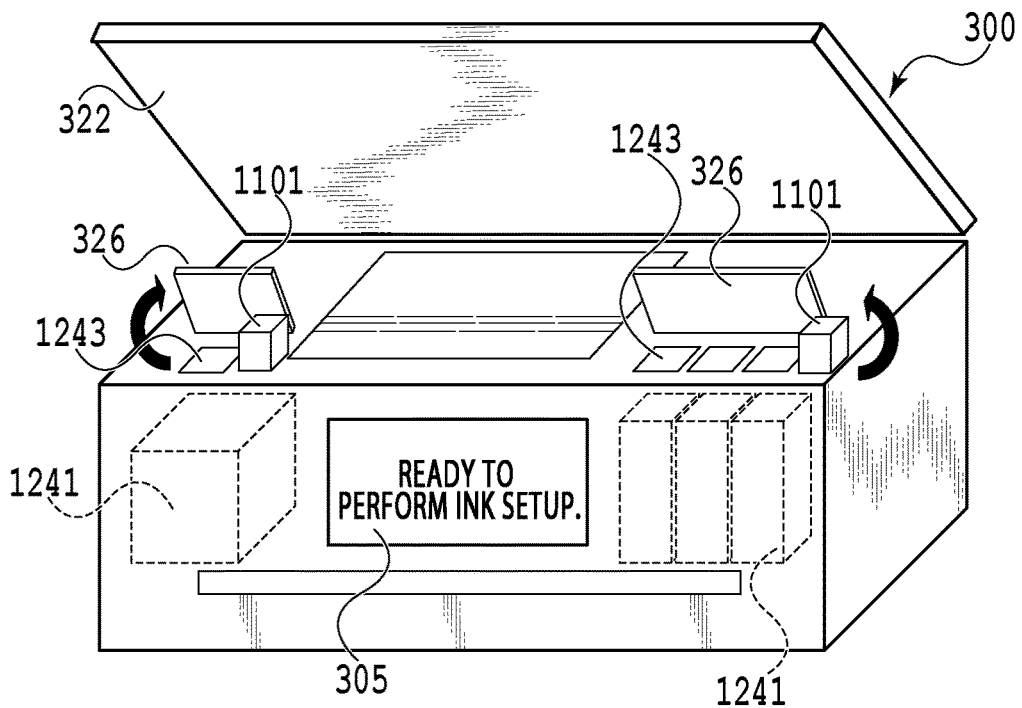
FIGS. 13A and 13B are exterior views of the printer in ink setup.
Figure 13B:
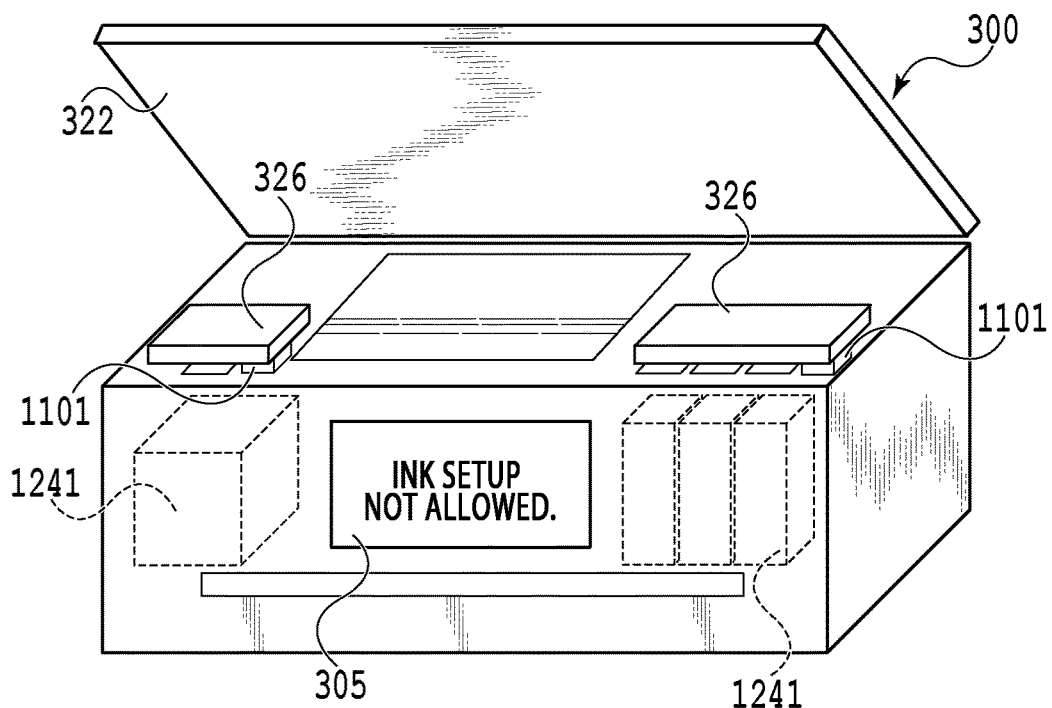

FIGS. 13A and 13B are exterior views illustrating a step of introducing inks in ink bottles 1242 into the incorporated ink tanks 1241. The printer 300 includes the cover 322, which covers the opening portion of the printer 300, and the covers 326, which cover the ink inlet ports 1243. The cover 322 is capable of pivoting or moving between the opening portion and a closed portion of the printer 300. Each cover 326 is capable of pivoting or moving between an open position at which the corresponding ink inlet port(s) 1243 is(are) open and a closed position at which the cover 326 covers the ink inlet port(s) 1243. The covers 326 and the printer 300 are connected by solenoids (not illustrated), and the opening and closing of the covers 326 can be locked and unlocked by controlling the solenoids by means of the cover mechanism control circuit 321. In this way, it is possible to physically prohibit the user from opening the covers 326 by locking the covers 326 according to the status of the printer 300. In the present embodiment, the covers 326 are locked by the ink setup prohibition process. In the present embodiment, the opening portion of the printer 300 and the covers 326, which cover the ink inlet ports 1243, are formed to be separate, but these may be integrated with one another.

FIG. 13A is a view illustrating a state where the solenoids for the covers 326 are not actuated and therefore ink setup can be performed. With the covers 326 located at the open positions, the user can set ink bottles 1242 at the ink inlet ports 1243 and introduce the inks into the incorporated ink tanks 1241 in the printer 300. At this time, a display indicating that ink setup can be performed may be presented on the operation panel 305.

FIG. 13B is a view illustrating a state where the solenoids for the covers 326 are actuated as a result of the ink setup prohibition process, and therefore ink setup cannot be performed. The printer 300 locks the covers 326 via the solenoids in a case where the user should be prohibited from introducing the inks in the ink bottles 1242. In this case, the covers 326 remain closed and cannot be opened, thus making it physically impossible to perform ink setup. At this time, a display indicating that ink setup cannot be performed may be presented on the operation panel 305.

In the present embodiment, an example in which the ink tank-incorporated printer 300 controls whether to prohibit or permit ink introduction by locking or unlocking the covers 326 has been presented. The above locking control may be used for replacement of the printer head 324 as well. Alternatively, whether to prohibit or permit replacement of the printer head 324 may be controlled by controlling the movement of the head mount 1001 via the carriage 1002 as with the above-described ink tank-integrated printer head and ink tank-separated printer head.

Next, a flow of initial setup of a printer in the present embodiment will be described. The main setup operations performed in initial setup of a printer include network setup and ink setup. In the ink setup, the user attaches ink tanks at a predetermined position(s) in a case where the ink tanks are detachable. In a case where the printing apparatus is the ink tank-incorporated type, the user mounts ink bottles at predetermined positions and introduces the inks into the printing apparatus. In response to confirming introduction of the inks, the printing apparatus performs ink cleaning or a process of filling the inks into the printer head, such as ink filling.

Network setup is another thing which the user performs in the initial setup. The network setup is an operation of configuring settings for connecting the printing apparatus to a desired access point so that the printing apparatus can communicate with external apparatuses through a network.

The ink setup and the network setup are not directly associated with each other in terms of order. Thus, in the initial setup, it is desirable for the user that the initial setup succeed regardless of which setup is performed first. For this reason, either setup may be performed before the other. Nonetheless, there are cases where an error occurs during the network setup after filling the inks into the printer in the ink setup or during the contract check after the network setup. Specifically, there is, for example, a case where a service has not been opened for a printer supporting a so-called subscription contract in which the user is charged a predetermined usage fee per a predetermined period. The user will not be able to start using the printer in a case the contract for the service is not confirmed to have been properly signed. In such a case, the user may cancel the service contract and return the printing apparatus to the service provider. This leads to a possibility of various problems such as experiencing ink leakage during movement resulting from the return, having to perform maintenance work to reuse the printing apparatus, and wasting the inks filled in the setup. In the following, a flow of initial setup taking concerns as mentioned above into account will be described.

Figure 14:
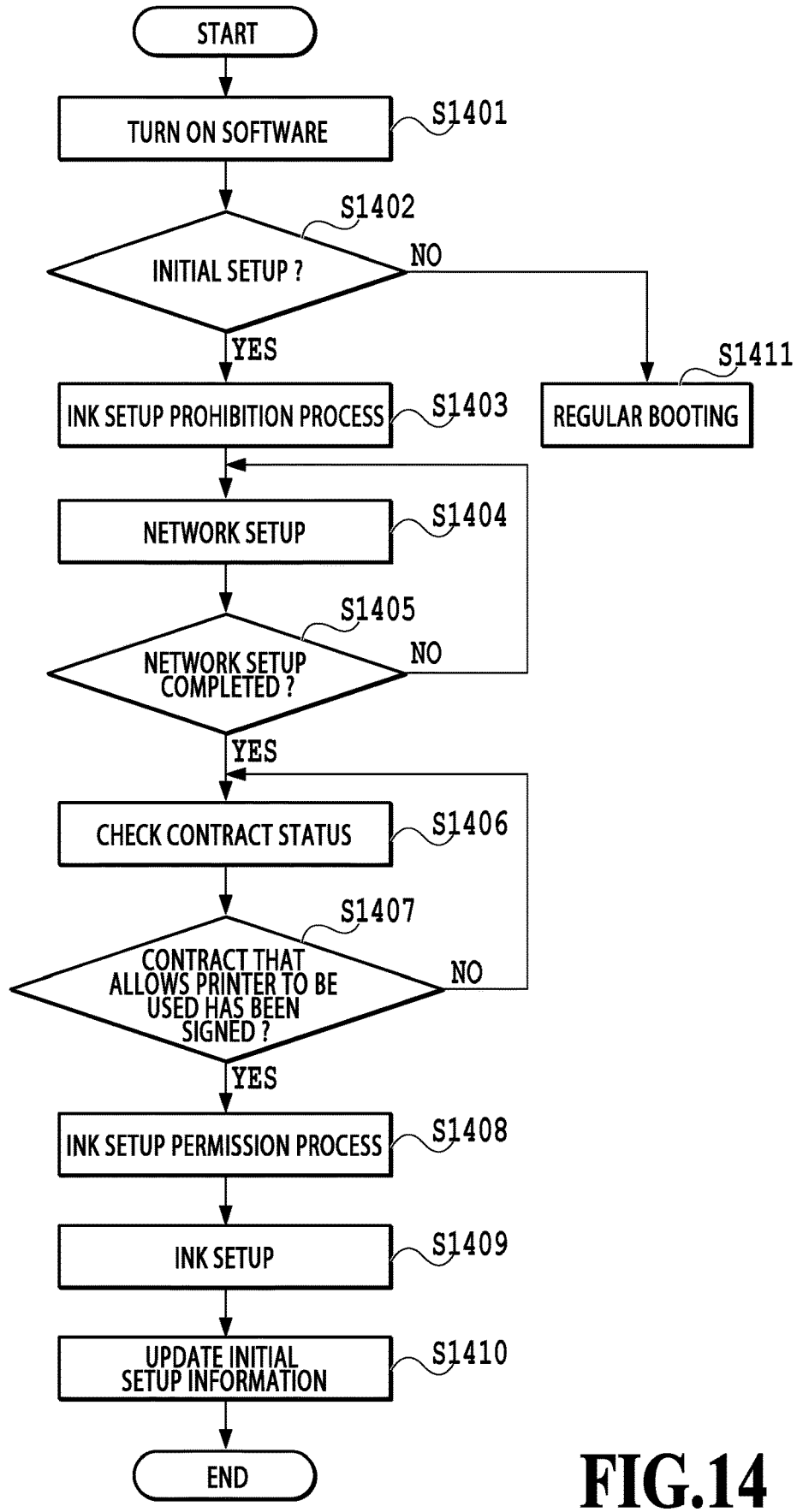
FIG. 14 is a flowchart of initial setup of a printer.

FIG. 14 is a flowchart illustrating an initial setup process executed by the printer 300 supporting a flat rate contract in the present embodiment. The CPU 311 implements this flowchart by loading a control program for the flowchart stored in the ROM 313 or an external storage apparatus (not illustrated) to the data memory 314 and executing that control program. This flowchart starts with the power supply of the printer 300 turned off.

First, in S1401, in response to detecting that a power button of the printer 300 is pressed (a power on operation is performed), the CPU 311 shifts the printer 300 to a power on state from the power off state.

Then, in S1402, the CPU 311 determines whether initial setup is being performed by referring to information stored in the data memory 314 indicating whether initial setup is being performed. Specifically, in a case where the printer 300 is booted for the first time, an initial setup flag in the data memory 314 is ON. On the other hand, in the process of booting the printer 300 for the second time or later, the initial setup flag in the data memory 314 is OFF. The CPU 311 makes the determination in S1402 by referring the initial setup flag. The CPU 311 proceeds to S1403 if determining that initial setup is being performed, and proceeds to S1411 if determining that initial setup is not being performed. This determination may be made by, for example, determining whether initial setup of the printer 300 has been done in the past. In S1411, the CPU 311 boots the printer 300 in a regular manner. Thereafter, the CPU 311 terminates the flowchart.

If determining in S1402 that initial setup is being performed, the CPU 311 performs an ink setup prohibition process in S1403. This makes it physically impossible for the user to perform ink setup irrespective of the ink configuration (ink tank-separated type, ink tank-integrated type, or ink tank-incorporated type). Specifically, with the ink tank-integrated type and the ink tank-separated type, the printer head 324 is kept at the ink setup-impossible position as illustrated in FIG. 11B even with the cover 322 opened and moved to the open position. With ink tank-incorporated type, ink setup is impossible (the covers are locked) as illustrated in FIG. 13B. Details of the ink setup prohibition process will be described later with reference to FIGS. 15 and 16. The ink setup prohibition process is performed immediately after determining in S1402 that initial setup is being performed, thereby preventing ink setup from preceding network setup. This helps eliminate the concern mentioned above that the printer may be returned to the provider with inks filled therein.

Then, in S1404, the CPU 311 starts network setup. The network setup is a process for connecting the printer 300 to the Internet 104 through the local area network 102 and the router 103. In the present embodiment, the network setup is setup for the wireless LAN control circuit 318 to become able to communicate with a network by controlling the wireless LAN unit 308. Nonetheless, the actual communication method is not limited, and the contents of the setup are therefore not particularly limited. For example, the contents of the setup may be such that the printer 300 connects to the router 103 via a wired LAN connection to become able to communicate with the network.

Specifically, in S1404, the CPU 311 firstly causes the printer 300 to start operating in the connection setup mode.

Then, the CPU 311 waits for a wireless connection to be established between the smartphone 500 and the printer 300 and infrastructure setup information to be received from the smartphone 500. If receiving infrastructure setup information, the CPU 311 establishes a wireless connection between the printer 300 and the router 103 based on the infrastructure setup information. This completes the network setup. The network setup method is not limited to this method. The network setup may be executed by having the user connect the printer 300 and the router 103 by wire and having the CPU 311 detect that a connection is established between the printer 300 and the router 103 by wire. Also, instead of the network setup based on the infrastructure setup information received from the smartphone 500, network setup based on operations on the printer 300 itself may be executed. Specifically, in the network setup based on operations on the printer 300 itself, the printer 300 searches for networks around itself based on a predetermined user operation on itself, and displays the found networks. Then by accepting selection of one of the displayed networks and input of the password for the selected network, the printer 300 connects to the access point forming the selected network (the router 103 in this example).

In S1405, the CPU 311 determines whether the network setup has been completed. The CPU 311 proceeds to S1406 if determining that the network setup has been completed, and continues the network setup in S1404 if determining that the network setup has not been completed. Specifically, in this step, the CPU 311 determines whether the printer 300 has connected to the Internet 104, for example. The network setup is considered completed in a case where the printer 300 has connected to the Internet 104. The case where the printer 300 has connected to the Internet 104 corresponds specifically to a case where the printer 300 becomes able to execute Internet communication. The present embodiment is not limited to this manner. Specifically, in this process, the CPU 311 may determine whether the printer 300 can access the cloud server through the Internet 104, for example. The network setup is considered completed in a case where the printer 300 can access the cloud server through the Internet 104.

In the above, a configuration has been described in which, in network setup, the printer 300 receives infrastructure setup information from the smartphone 500 and a wireless connection is established between the printer 300 and the router 103. Alternatively, for example, in network setup, a wireless connection can be established between the printer 300 and the smartphone 500 by causing the printer 300 to operate in the direct connection mode. Specifically, in the case of causing the printer 300 to operate in the direct connection mode, the smartphone 500 wirelessly sends direct setup information which is setup information for causing the printer 300 to operate in the direct connection mode to the printer 300. The direct setup information contains instructions to, for example, enable the WFD function to cause the printer 300 to operate as the Group Owner and to enable setup of an access point for the printer 300. The smartphone 500 obtains connection information necessary for directly connecting to the printer 300 from the printer 300. The connection information for directly connecting to the printer 300 contains information such as the SSID, password, and the like of the printer 300, for example. The user can select whether to cause the printer 300 to operate in the infrastructure connection mode or in the direct connection mode as desired on a screen displayed on the smartphone 500. Based on the user's selection, the smartphone 500 determines whether to send the infrastructure setup information or to send the direct setup information to the printer 300.

In a case where the printer 300 is caused to operate in the direct connection mode to establish a wireless connection between the printer 300 and the smartphone 500 as a result of network setup as described above, the printer 300 may fail to execute Internet communication. Thus, in such a case, the CPU 311 may give NO as the result of the determination in S1405.

In S1406, the CPU 311 checks the contract status through the network to which the printer 300 has connected as a result of the network setup. Specifically, the CPU 311 checks whether the printer 300 having established a connection to the network has signed up with, for example, a flat rate service. The contract status is checked by sending a contract status inquiry to the cloud server (S907 in FIG. 9). Subsequently, in S1407, the CPU 311 determines whether the printer 300 can be used with the checked contract status. The CPU 311 proceeds to S1408 if determining that the printer 300 can be used.

On the other hand, if determining that the printer 300 cannot be used, the CPU 311 returns to S1406 and continues checking the contract status. In this case, the user needs to sign another service contract that allows the printer 300 to be used, for example, via the Internet.

In the present embodiment, the contents of the contract checked in S1407 are not particularly defined. For example, the contract may be an ink subscription contract with an upper limit or a contract to rent only the printer 300.

If determining in S1407 that the contract is one that allows the printer to be used, the CPU 311 performs an ink setup permission process in S1408. This is a process to cancel the ink setup prohibition process performed in S1403. Specifically, with the ink tank-integrated type or the ink tank-separated type, the printer head 324 is shifted to an ink setup-possible position as illustrated in FIG. 11A. With ink tank-incorporated type, ink setup becomes possible (the covers are not locked) as illustrated in FIG. 13A.

Performing the ink setup permission process in S1408 makes it possible for the user to perform ink setup in S1409. Specifically, the user uses any of the methods illustrated in FIGS. 10A to 13B. Finishing the ink setup in S1409 completes the initial setup of the printer 300, so that the printer is now ready to use. Thus, in S1410, the CPU 311 updates the information indicating whether initial setup is being performed. In this way, the next or subsequent time the printer 300 shifts to the software-on state, it will be possible to indicate that initial setup is not being performed. After the process of S1410, the CPU 311 terminates the flowchart.

In the present embodiment, the network setup S1404 and the ink setup S1409 are presented as the types of setup which the user performs in the initial setup. In the actual initial setup, other types of setup may be performed. Other types of setup than the network setup and the ink setup may be performed with any timing. For example, setup of the display language on the operation panel 305 of the printer 300, setup of the country where the printer 300 is used, and setup of the current time may be performed in steps before the network setup S1404. Also, the printer 300 may execute a process of receiving answers to a questionnaire from the user between S1409 and S1410. The timing to execute this process is not limited, and the process may be performed in a step before the network setup S1404, for example.

By the flow described above with reference to FIG. 14, the user can authenticate through the network in advance that a service contract supported by the printer 300 has been signed, and then perform ink setup of the printer 300.

Next, details of the ink setup prohibition process in S1403 in FIG. 14 will be described using FIG. 15 for the ink tank-separated type and the ink tank-integrated type and FIG. 16 for the ink tank-incorporated type.

Figure 15:
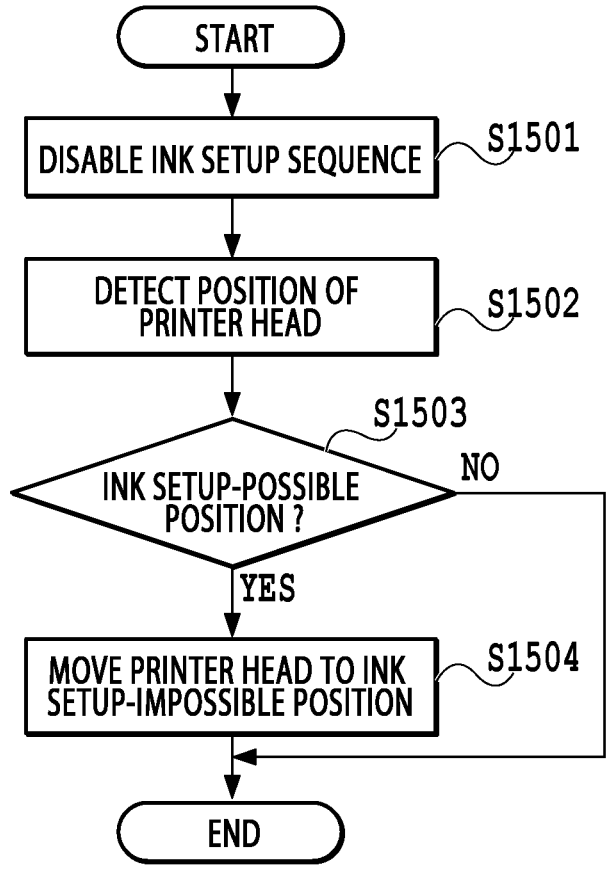
FIG. 15 is a flowchart of ink setup.

FIG. 15 illustrates a flow of the ink setup prohibition process for the ink tank-separated or ink tank-integrated configuration.

First, in S1501, the CPU 311 of the printer 300 deactivates an ink setup sequence. Specifically, the CPU 311 changes an internal setting to indicate that ink setup of the printer 300 is being prohibited.

Then, in S1502, the CPU 311 detects the position of the printer head. In one example method of detecting the position of the printer head 324, the position of the carriage or the head mount 1001 is stored in the data memory 314 with a counter to identify where the printer head 324 is located in the printer 300. The position may be detected by a method other than the above method.

Then, in S1503, the CPU 311 determines whether the printer head 324 is currently at an ink setup-possible position. The CPU 311 proceeds to S1504 if determining that the printer head 324 is currently at the ink setup-possible position. On the other hand, if determining that the printer head 324 is not currently at the ink setup-possible position, the CPU 311 maintains the position of the printer head 324 at the current position and terminates the ink setup prohibition process since it is physically impossible for the user to perform ink setup.

In S1504, the CPU 311 moves the printer head 324 to an ink setup-impossible position. The ink setup-impossible position is the position illustrated in FIG. 11B, but may be another position as long as the user cannot perform ink setup at that position. The printer head 324 may be initially set at the ink setup-impossible position at the time of shipment. The above is a flow of the ink setup prohibition process for the ink tank-separated or ink tank-integrated configuration.

Figure 16:
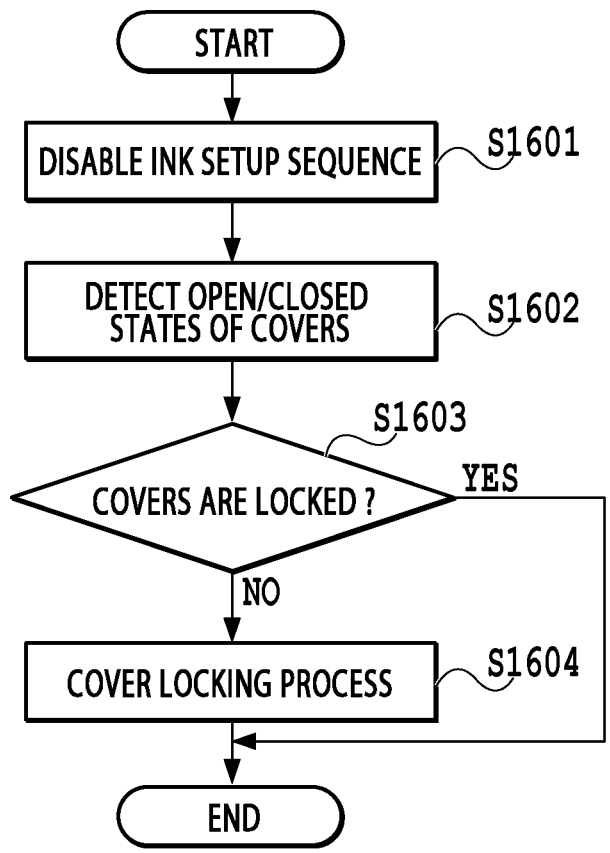
FIG. 16 is a flowchart of ink setup of a printer.

FIG. 16 is a flow of the ink setup prohibition process for the ink tank-incorporated configuration.

First, in S1601, the CPU 311 of the printer 300 deactivates an ink setup sequence. Specifically, the CPU 311 changes an internal setting to indicate that ink setup of the printer 300 is being prohibited.

Then, in S1602, the CPU 311 detects the open/closed states of covers. In an example method of detecting the states of the covers 326, whether the covers 326 are closed or open is identified with the cover sensors 1101. Then, in S1603, the CPU 311 determines whether the covers are locked. This determination is performed by detecting the states of the solenoids. If determining that the covers are locked, the CPU 311 terminates the flow without a further step since it is physically impossible for the user to perform ink setup. If determining that the covers are not locked, the CPU 311 proceeds to S1604 and locks the covers 326 with the solenoids. The ink setup-impossible position represents the state illustrated in FIG. 13B, but another arrangement may be used as long as the user cannot perform ink setup. For example, an arrangement in which a valve is provided at each ink inlet port 1243 and is opened or closed with a solenoid may be employed. The above is a flow of the ink setup prohibition process for the ink tank-incorporated configuration.

Figure 17A:
FIGS. 17A and 17B are diagrams illustrating display screens on a printer.
Figure 17B:

FIGS. 17A and 17B are diagrams illustrating display screens on the printer 300. As illustrated in FIGS. 17A and 17B, during the ink setup prohibition process, the printer 300 may notify the operation panel 305 of the printer 300 that ink setup is currently impossible. A display 1701 in FIG. 17A is a display screen displayed in a case where network setup has not been completed during initial setup. A display 1702 represents an example of a display screen displayed in a case where a predetermined contract cannot be confirmed in the contract check which is a process after the completion of the network setup. The display contents are not limited to these, and display contents suitable for the situation are desirably displayed.

As described above, according to the present embodiment, it is possible to obtain contract information on a contract related to the use of a printing apparatus connectable to a network, and more appropriately control the printing apparatus. Specifically, in initial setup of a printer, network setup is performed before ink setup. In this way, even if the user fails to complete the network setup and ends up returning the printer, the cost for the initial setup is lower. Specifically, it is possible to prevent ink leakage during movement resulting from the return, maintenance work to reuse the printing apparatus, consumption of the inks in the setup, and the like.

OTHER EMBODIMENTS

In the above, the ink setup prohibition process is canceled in a case where the result of the determination in S1405 is YES and the result of the determination in S1407 is YES. However, the present disclosure is not limited to this manner. For example, the ink setup prohibition process may be canceled before the process of S1406 after the result of the determination in S1405 is YES. That is, the ink setup prohibition process may be canceled simply in a case where the result of the determination in S1405 is YES.

In the above, the printer 300 is configured to be capable of performing printing only with inks provided to the user by a flat rate service. However, the printer 300 may be configured to be switchable between, for example, a first mode in which printing is performed with inks provided to the user by a flat rate service and a second mode in which printing is performed with inks prepared by the user by any method which are different from the inks provided by the flat rate service. In this case, the printer 300 may be configured to determine whether it is in the first mode or in the second mode after S1402, execute S1403 if determining that it is in the first mode, and not execute the prohibition process if determining that it is in the second mode. The printer 300 may execute ink setup before the network setup process if determining that it is in the second mode.

The present disclosure can be implemented by providing a program that implements one or more of the functions of the above embodiment to a system or an apparatus via a network or a storage medium, and causing one or more processors in a computer of the system or the apparatus to read out and execute the program. Also, the present disclosure can be implemented with a circuit that implements one or more of the functions (e.g., application-specific integrated circuit (ASIC)).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140896, filed Sep. 5, 2022, which is hereby incorporated by reference herein in its entirety.

What is claimed is:

1. A printing apparatus capable of executing printing using a printing material, comprising:
    a memory for storing instructions; and
    and a processor for executing the instructions to operate as:
    an accepting unit that accepts an operation to power on the printing apparatus;
    a first determination unit that determines, in a case where the operation is accepted, whether the printing apparatus operates in a first mode in which printing is performed with a printing material provided by a subscription service or whether the printing apparatus operates in a second mode in which printing is performed with a printing material different from the printing material provided by the subscription service;
    a first control unit that executes, in a case where it is determined the printing apparatus operates in the first mode, predetermined control for preventing an operation of increasing the printing material included in the printing apparatus from being performed by a user and a network setup process for receiving connection information for connecting to an external access point of the printing apparatus from an external terminal apparatus of the printing apparatus before execution of an ink setup process for accepting the operation of increasing the printing material included in the printing apparatus from the user, and executes, in a case where it is determined that the printing apparatus operates in the second mode, the network setup process after the execution of the ink setup process and without execution of the predetermined control;
    a second determination unit that determines, in a case where it is determined the printing apparatus operates in the first mode, whether the printing apparatus has connected to an Internet after the network setup process has been executed;
    a first display unit that displays a first screen on a display in a case where it is determined the printing apparatus has not connected to the Internet, the first screen including a message indicating the predetermined control is being executed and a message prompting a user to execute a process for connecting the printing apparatus to the Internet;
    an obtaining unit that obtains contract information through the Internet in a case where it is determined the printing apparatus has connected to the Internet, the contract information regarding a predetermined contract related to use of the printing apparatus;
    a confirmation unit that confirms whether the user can use the printing apparatus in a contract status indicated by the contract information;
    a second display unit that displays a second screen on the display in a case where it is not confirmed the user can use the printing apparatus in the contract status indicated by the contract information, the second screen including a message indicating the predetermined control is being executed and a message prompting the user to execute a procedure for the predetermined contract; and
    a cancellation unit that cancels the predetermined control in a case where the printing apparatus connects to the Internet and it is confirmed the user can use the printing apparatus in the contract status indicated by the contract information.

2. The printing apparatus according to claim 1, wherein the predetermined contract is a contract related to a subscription service.

3. The printing apparatus according to claim 1, wherein the operation of increasing the printing material included in the printing apparatus is an operation of attaching, by a user, a cartridge holding the printing material to a printer head, and
the predetermined control is control that prevents the printer head from moving to a predetermined position for attaching the cartridge even in a case where a cover included in the printing apparatus is opened.

4. The printing apparatus according to claim 1, wherein the operation of increasing the printing material included in the printing apparatus is an operation of attaching, by a user, a cartridge holding the printing material to a printer head,
the printer head is moved to a predetermined position for attaching the cartridge in a case where a cover included in the printing apparatus is opened, and
the predetermined control is control that locks the cover included in the printing apparatus.

5. The printing apparatus according to claim 1, wherein the operation of increasing the printing material included in the printing apparatus is an operation of introducing, by a user, the printing material from a bottle to a tank included in the printing apparatus, and
the predetermined control is control that locks a cover that covers an inlet port for introducing, by a user, the printing material from the bottle to the tank included in the printing apparatus.

6. The printing apparatus according to claim 1, wherein the predetermined control is not executed in a case where the operation is accepted after the initial setup of the printing apparatus is completed.

7. The printing apparatus according to claim 1, wherein the first screen and the second screen are not displayed in a case where the operation is accepted after the initial setup of the printing apparatus is completed.

8. The printing apparatus according to claim 1, wherein the processor further executes instructions to operate as:
a third display unit that displays a third screen on the display in a case where the predetermined control is cancelled, the third screen including a message indicating that a user can execute the operation of increasing the printing material included in the printing apparatus.

9. A method of controlling a printing apparatus capable of executing printing using a printing material, the method comprising:
an accepting step of accepting an operation to power on the printing apparatus;
a first determination step of determining, in a case where the operation is accepted, whether the printing apparatus operates in a first mode in which printing is performed with a printing material provided by a subscription service or whether the printing apparatus operates in a second mode in which printing is performed with a printing material different from the printing material provided by the subscription service;
a first control step of executing, in a case where it is determined the printing apparatus operates in the first mode, predetermined control for preventing an operation of increasing the printing material included in the printing apparatus from being performed by a user and a network setup process for receiving connection information for connecting to an external access point of the printing apparatus from an external terminal apparatus of the printing apparatus before execution of an ink setup process for accepting the operation of increasing the printing material included in the printing apparatus from the user, and executing, in a case where it is determined that the printing apparatus operates in the second mode, the network setup process after the execution of the ink setup process and without execution of the predetermined control;
a second determination step of determining, in a case where it is determined the printing apparatus operates in the first mode, whether the printing apparatus has connected to an Internet after the network setup process has been executed;
a first display step of displaying a first screen on a display in a case where it is determined the printing apparatus has not connected to the Internet, the first screen including a message indicating the predetermined control is being executed and a message prompting a user to execute a process for connecting the printing apparatus to the Internet;
an obtaining step of obtaining contract information through the Internet in a case where it is determined the printing apparatus has connected to the Internet, the contract information regarding a predetermined contract related to use of the printing apparatus;
a confirmation step of confirming whether the user can use the printing apparatus in a contract status indicated by the contract information;
a second display step of displaying a second screen on the display in a case where it is not confirmed the user can use the printing apparatus in the contract status indicated by the contract information, the second screen including a message indicating the predetermined control is being executed and a message prompting the user to execute a procedure for the predetermined contract; and
a cancellation step of cancelling the predetermined control in a case where the printing apparatus connects to the Internet and it is confirmed the user can use the printing apparatus in the contract status indicated by the contract information.

10. A non-transitory computer readable storage medium storing a program which functions in a printing apparatus and causes the printing apparatus to function as:
an accepting unit that accepts an operation to power on the printing apparatus;
a first determination unit that determines, in a case where the operation is accepted, whether the printing apparatus operates in a first mode in which printing is performed with a printing material provided by a subscription service or whether the printing apparatus operates in a second mode in which printing is performed with a printing material different from the printing material provided by the subscription service;
a first control unit that executes, in a case where it is determined the printing apparatus operates in the first mode, predetermined control for preventing an operation of increasing the printing material included in the printing apparatus from being performed by a user and a network setup process for receiving connection information for connecting to an external access point of the printing apparatus from an external terminal apparatus of the printing apparatus before execution of an ink setup process for accepting the operation of increasing the printing material included in the printing apparatus from the user, and executes, in a case where it is determined that the printing apparatus operates in the second mode, the network setup process after the execution of the ink setup process and without execution of the predetermined control;
a second determination unit that determines, in a case where it is determined the printing apparatus operates in the first mode, whether the printing apparatus has connected to an Internet after the network setup process has been executed;
a first display unit that displays a first screen on a display in a case where it is determined the printing apparatus has not connected to the Internet, the first screen including a message indicating the predetermined control is being executed and a message prompting a user to execute a process for connecting the printing apparatus to the Internet;
an obtaining unit that obtains contract information through the Internet in a case where it is determined the printing apparatus has connected to the Internet, the contract information regarding a predetermined contract related to use of the printing apparatus;
a confirmation unit that confirms whether the user can use the printing apparatus in a contract status indicated by the contract information;
a second display unit that displays a second screen on the display in a case where it is not confirmed the user can use the printing apparatus in the contract status indicated by the contract information, the second screen including a message indicating the predetermined control is being executed and a message prompting the user to execute a procedure for the predetermined contract; and
a cancellation unit that cancels the predetermined control in a case where the printing apparatus connects to the Internet and it is confirmed the user can use the printing apparatus in the contract status indicated by the contract information.

* * * * *